(12) United States Patent
Hu et al.

(10) Patent No.: US 11,061,529 B2
(45) Date of Patent: Jul. 13, 2021

(54) GENERATING CONTEXTUAL GUIDES

(71) Applicant: Adobe Inc., San Jose, CA (US)

(72) Inventors: Yang-Chen Hu, Brooklyn, NY (US); Lawrence Hsu, San Francisco, CA (US); Hoyle Wang, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 88 days.

(21) Appl. No.: 16/384,369

(22) Filed: Apr. 15, 2019

(65) Prior Publication Data

US 2020/0326829 A1 Oct. 15, 2020

(51) Int. Cl.
*G06F 3/048* (2013.01)
*G06F 3/0481* (2013.01)
*G06F 3/0488* (2013.01)
*G06F 3/0482* (2013.01)
*G06F 3/0484* (2013.01)

(52) U.S. Cl.
CPC ........ *G06F 3/04812* (2013.01); *G06F 3/0482* (2013.01); *G06F 3/04845* (2013.01); *G06F 3/04883* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 2014/0104189 A1* | 4/2014 | Marshall | G06F 3/0488 345/173 |
| 2014/0304627 A1* | 10/2014 | Finnell | G06F 8/38 715/763 |
| 2014/0375646 A1* | 12/2014 | Gagne | G09G 5/00 345/428 |

* cited by examiner

*Primary Examiner* — Thanh T Vu

(57) ABSTRACT

Techniques are described for utilizing drawing guides in an electronic canvas. The techniques may include detecting a first input at an edge of an artboard associated with the electronic canvas, triggering, responsive to the detected first input, a plurality of selectable indicators to enable configuration of a drawing guide for providing an interactive reference for placing content in the artboard, detecting a second input pertaining to at least one of the plurality of selectable indicators, determining a location in the artboard corresponding to the distance from the edge of the artboard, and triggering the at least one drawing guide for display in the artboard at the determined location.

14 Claims, 23 Drawing Sheets

GENERATING CONTEXTUAL GUIDES

TECHNICAL FIELD

This description relates to generating contextual drawing guides in electronic graphics processing applications.

BACKGROUND

Image processing applications may be used to generate image content. Such applications can provide a number of tools to assist graphics designers in creating and editing image content. For example, the tools may allow image content to be edited and moved within the application. One example of such a tool may be referred to as a ruler guide.

A ruler guide may represent a feature of graphic design that facilities aligning visual elements in the image processing application. The ruler guide may show measurement information that a designer may utilize when aligning the visual elements. In particular, ruler guides may be used to align visual elements horizontally or vertically within a design document, for example.

In general, a guide may be positioned in a selected location on a design document based on a set of measurements associated with the application presenting the design document. The ruler guide, which may appear horizontally and/or vertically within the image processing application user interface, generally includes measurement markings (e.g., inches, centimeters, millimeters, etc.) which may be used to place individual guides on measured positions in a design document.

While ruler guides provide a way to define how to align content using an application level container, the defined alignment may not be transportable into additional documents, canvases, or artboards within the same design session. In addition, an alignment defined for a first design document may not be transportable into designs in other areas of a canvas or other documents associated with the design document. Consequently, the designer may have to re-align content when accessing a different design or file. In addition, conventional ruler guides may interfere with workspace in the user interface, which may distract the user from the content in the workspace. Redefining guides for each design (one guide at a time) can be both tedious and time consuming.

SUMMARY

The systems and techniques described herein may be used to generate, edit, and arrange customized drawing guides within artboards accessed in graphic design applications (e.g., image/vector art processing application, design software application, computer graphic design applications, etc.). In particular, the systems and techniques described herein may be configured to provide a globally available guide manipulation tool that is accessible within the context of designing content at the artboard level (rather than at the application container level) to ensure that guides are transferrable across artboards, canvases, designs, files, software applications, etc. Such a tool may be helpful to users attempting to save drafting time and avoid repetitive steps in their design process.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described for utilizing drawing guides in an electronic canvas. The method may include detecting a first input at an edge of an artboard associated with the electronic canvas, the first input including a hover motion, triggering, responsive to the detected first input, a plurality of selectable indicators to enable configuration of a drawing guide for providing an interactive reference for placing content in the artboard, and detecting a second input pertaining to at least one of the plurality of selectable indicators. The second input may include an input defining a distance from the edge of the artboard. The method may also include determining a location in the artboard corresponding to the distance from the edge of the artboard and triggering the at least one drawing guide for display in the artboard at the determined location. Other embodiments of this aspect include corresponding computer systems, apparatus, and computer programs recorded on one or more computer storage devices, each configured to perform the actions of the methods.

Implementations may include one or more of the following features. The method described above in which the plurality of indicators include guide handle indicators depicting that the at least one drawing guide is editable, and a direction indicator depicting two or more directions in which the at least one drawing guide is movable. The method described above in which the first input triggers, for the artboard, display of a location indicator depicting a measure of distance from one or more edges of the artboard or a measure of distance from one or more drawing objects, a color change of the edge of the artboard or a color change of the at least one drawing guide associated with the first input, wherein each are triggered by the first input.

The method described above may further include having the at least one drawing guide configured to change from a first opacity value to a second opacity value upon detecting the second input, and where the first opacity value is higher than the second opacity value. The method described above in which the at least one drawing guide includes copy-and-paste functionality, and the method further includes copying the at least one drawing guide from the artboard and pasting the at least one drawing guide into a plurality of additional artboards generated in the electronic canvas. The method may also include storing the at least one drawing guide as a default drawing guide, for the at least one artboard and for the plurality of additional artboards, where reorganizing the artboard and the plurality of additional artboards within the electronic canvas results in retaining configuration settings of the at least one drawing guide for the artboard and for the plurality of additional artboards.

The method described above may also utilize a guide generator as a replacement for a ruler guide associated with the electronic canvas. The method as described above may also include configuring the at least one drawing guide for the artboard triggers generation of the at least one drawing guide for each open artboard within the electronic canvas. Implementations of the described techniques may include hardware, a method or process, or computer software on a computer-accessible medium.

In another general aspect, a system of one or more computers can be configured to perform particular operations or actions by virtue of having software, firmware, hardware, or a combination of them installed on the system that in operation causes or cause the system to perform the actions. The system may include a computer program product for utilizing drawing guides in an electronic canvas. The computer program product may be embodied on a non-transitory computer-readable storage medium and instructions that, when executed by at least one computing device, is configured to cause the at least one computing device to generate and display a first drawing guide for an artboard associated with the electronic canvas, the first drawing guide being depicted at a user-selected location in response to receiving an input associated with a first edge of the artboard, automatically generate a second drawing guide parallel to the first drawing guide and offset a distance from a second edge of the artboard, the distance being equal to a distance from the first edge of the artboard to the user-selected location, the second drawing guide being displayed in the artboard while the first drawing guide is displayed. In some implementations, modifying the first drawing guide causes the same modification of the second drawing guide at an offset from at least one artboard element.

Implementations may include one or more of the following features. In some implementations, the at least one artboard element includes another drawing guide and the modification triggers display of a pixel location indicating a distance of the first drawing guide to the other drawing guide and a pixel location indicating a distance of the second drawing guide to the other drawing guide. In some implementations, the at least one artboard element includes a drawing object and the modification triggers display of a pixel location indicating a distance from the drawing object to the first drawing guide and a pixel location indicating a distance from the drawing object to the second drawing guide.

In some implementations, each drawing guide associated with the artboard is selectable, using a marquee selection tool, the selecting including selection of a respective guide handle for each drawing guide, the respective guide handle being located outside of the artboard and configured with copy-and-paste functionality to be copied from the artboard and pasted to another artboard associated with the electronic canvas.

In some implementations, the actions may include in response to detecting a hover input on the first drawing guide or the second drawing guide, increasing a line width associated with the first drawing guide and the second drawing guide to indicate that moving either the first drawing guide or the second drawing guide moves both the first drawing guide and the second drawing guide at the same time and over the same distance. In some implementations, the first drawing guide and the second drawing guide are configured to snap to one or more drawing objects with equal spacing relative to a distance between the first drawing guide and the second drawing guide. Implementations of the described techniques may include hardware, a method or process, or computer software on a computer-accessible medium.

In another general aspect, a system is described for arranging content in an electronic document at a computing device. The system may include at least one memory including instructions and at least one processor that is operably coupled to the at least one memory and that is arranged and configured to execute instructions that, when executed, cause the at least one processor to implement an application having a user interface. The application may have access to an input device and may include a guide generator configured to utilize the memory and processor to detect a first input at an edge of an artboard associated with the electronic document. The first input may include a hover motion. The processor may also trigger, responsive to the detected first input, a plurality of selectable indicators to enable configuration of a drawing guide for providing an interactive reference for placing content in the artboard. The processor may also detect a second input pertaining to at least one of the plurality of selectable indicators in which the second input defines a distance from the edge of the artboard, determine a location in the artboard corresponding to the distance from the edge of the artboard, and trigger the at least one drawing guide for display at the determined location.

Implementations may include one or more of the following features. In some implementations, the plurality of indicators comprise at least guide handle indicators depicting that the at least one drawing guide is editable, and a direction indicator depicting two or more directions in which the at least one drawing guide is movable.

In some implementations, the first input triggers, for the artboard, display of a location indicator depicting a measure of distance from one or more edges of the artboard or a measure of distance from one or more drawing objects and a color change of the edge of the artboard or a color change of the at least one drawing guide associated with the first input, each triggered by the first input. In some implementations, the content is configured to snap to the at least one drawing guide.

In some implementations, the at least one drawing guide includes copy-and-paste functionality, and the guide generator is further configured to receive a command to copy the at least one drawing guide from the artboard and receive a command to paste the at least one drawing guide into a plurality of additional artboards generated in an electronic canvas and store the at least one drawing guide as a default drawing guide, for the at least one artboard and for the plurality of additional artboards. In such examples, reorganizing the artboard and the plurality of additional artboards within the electronic canvas results in retaining configuration settings of the at least one drawing guide for the artboard and for the plurality of additional artboards. In some implementation, the guide generator is a replacement tool for a ruler guide associated with the electronic document. In some implementations, configuring the at least one drawing guide for the artboard triggers generation of the at least one drawing guide for each open artboard within the electronic document.

Implementations of the described techniques may include hardware, a method or process, or computer software on a computer-accessible medium. The details of one or more implementations are set forth in the accompanying drawings and the description below. Other features will be apparent from the description and drawings, and from the claims.

DETAILED DESCRIPTION

Figure 1A:
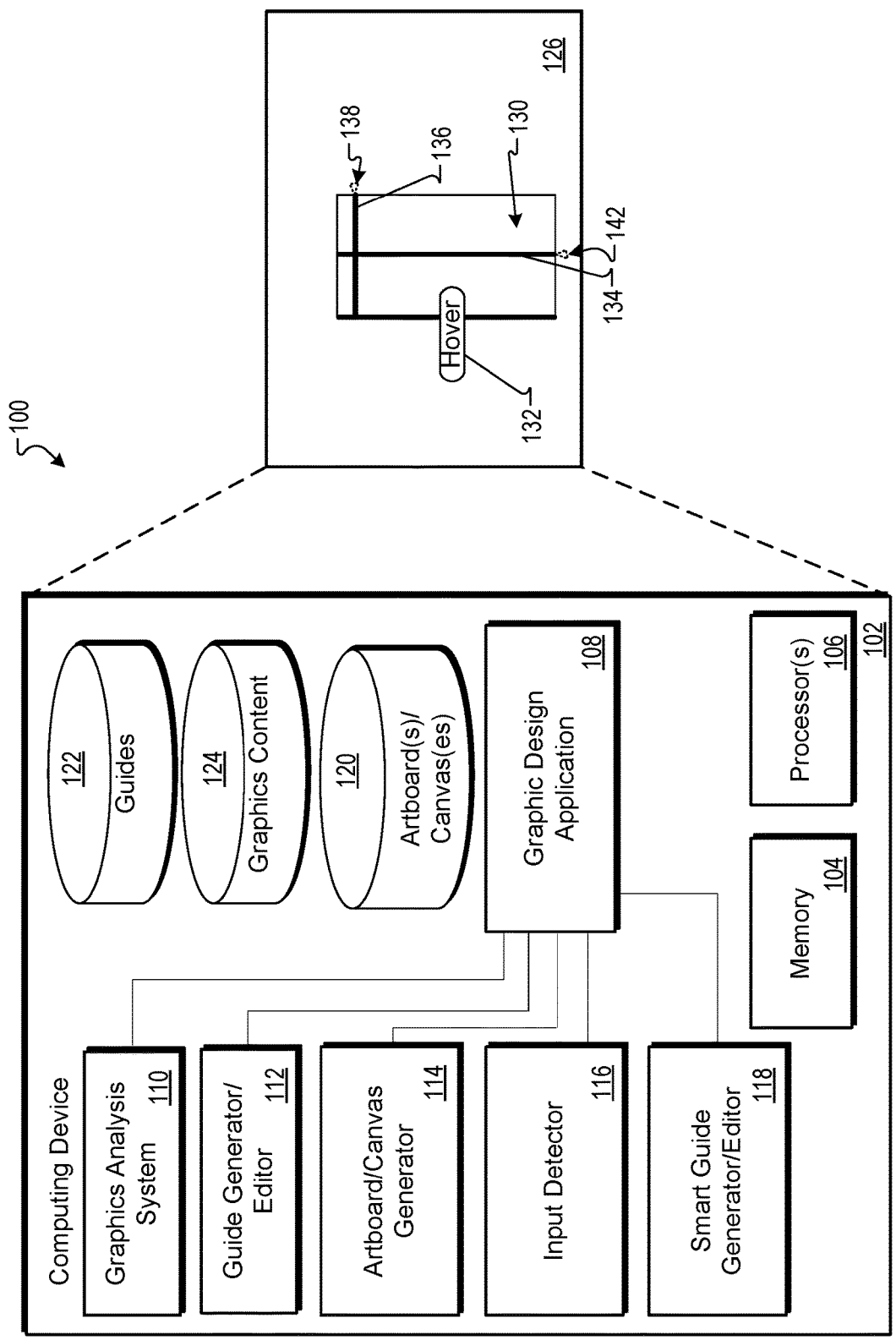
FIGS. 1A-1B are block diagrams of an example system for performing the techniques described herein.

This document describes systems and techniques that provide for contextually generated drawing guides (e.g., artboard guides, alignment guides, etc.) for computer graphic design. Contextually generated drawing guides may pertain to drawing guides that are generated at a container level below the application canvas (e.g., application container) used to generate drawing content. For example, contextually generated drawing guides may be generated at and associated with particular artboards within a canvas. Such drawing guides may correspond to particular aspects of one or more of the artboards to ensure that modifying and/or moving the artboards does not impact the placement of the drawing guides associated with the artboards. For example, a computer graphic design application may be accessed to generate an electronic canvas (e.g., design file) at the application canvas level. Any number of artboards, each representing at least one respective container, may be generated for the canvas. The systems and techniques described herein may be used to generate drawing guides for the artboards at the artboard container level such that a user may generate drawing guides within each individual artboard, rather than from the electronic canvas.

For example, a designer may design an app interface using a computer graphic design application (e.g., such as a user experience prototyping application). The user can then generate a number of drawing guides to assist with placement of content for the app interface. The systems and techniques described herein may be used to generate such drawing guides within the context of one or more artboards associated with the computer graphic design application. Generating drawing guides within the context of one or more artboards enables the generated drawing guides to remain associated with and properly configured for the artboards as the artboards are modified and/or moved. In traditional drawing guide generation, the drawing guides are generated within the context of the computer graphic design application (e.g., global application container level) rather than generated within the context of individual artboards. Such a configuration does not allow a guide to be moved and maintained with an artboard as the artboard is moved.

In general, drawing guides that are created outside of the context of artboards (using traditional drawing guide generation) can trigger additional rework and reconfiguration of drawing guides when the designer wishes to move canvases and/or artboards because aspects of particular artboards are not associated with the traditional drawing guides. The systems and techniques described herein may be used to generate drawing guides that ensure that such aspects of artboards correspond to the drawing guides, thus providing context for each generated drawing guide associated with any number of artboards. The context may pertain to artboard shapes, sizes, locations, scale, content within a particular artboard, user credentials associated with the artboard, and the like.

In addition, this document describes systems and techniques that may be used to generate, edit, and arrange customized drawing guides within artboards accessed in the graphic design applications (e.g., image/vector art processing application, design software application, etc.). The customized drawing guides may be generated for (or associated with) content such as files, canvases, artboards, artwork, objects, vector art/graphics, images, video, characters, and/or other content available to be accessed in graphic design applications.

As used herein, drawing guides may represent temporary alignment and/or snap-to guides that may be used to assist a user to create or manipulate graphics, objects, artboards, artwork, or other document content within a graphic design application. In general, drawing guides may help a user align, edit, and transform such content relative to other content. In some implementations, the drawing guides may display a graphic (e.g., a line or shape) along content and may display an X, Y location with delta values (or simply a pixel location or other unit of measure). For example, the location may be depicted in millimeters, percentage, or other points of locational reference. In some implementations, other guide-based feedback may be depicted with a drawing guide including, but not limited to measurement labels, object highlighting, color changes, line width changes, transparency changes, and/or user-defined content.

In conventional systems, drawing guides and ruler guides may be utilized with a single artboard, but such guides may not scale to digital design, in which there are often multiple artboards on a single electronic canvas. To accommodate such changes in the computer graphic design industry, the systems and techniques described herein allow users to create customized guides within a context of a local artboard, for example, and reuse the customized guides in multiple other artboards without having to recreate the customized guides for each canvas. That is, instead of having to select a ruler guide associated with an entire canvas to generate a guide, a user may contextually select a portion of an artboard to generate the drawing guide for the artboard. Other artboards may be selected before generation of the drawing guide and as such, the systems described herein may automatically generate the same positional guide on those other selected artboards. As used herein, an artboard may represent a defined, electronic document area for artwork to be generated, edited, printed, imported, and/or exported.

The systems and techniques described herein overcome technical challenges of previous systems and techniques, and improve the process(es) to perform guide generation and guide usage at the artboard level (i.e., at the artboard container). In particular, instead of generating drawing guides at the canvas (electronic design document), the systems and techniques described herein can provide generation of drawing guides from any edge of an artboard. Algorithms can take into account settings and features for the individual artboard when generating the graphic display of a user-generated drawing guide. For example, a smart drawing guide and/or a drawing guide may be generated and controlled at the artboard level. Thus, guides may be stored with each individual artboard as a setting, as a design object, or as a set of rules for use with the artboard.

In some implementations, from within a design software application, the systems and techniques described herein can function to generate a customized drawing guide in the context of a first artboard and ensure that the customized guide is reusable for any number of additional artboards, without losing access to native functionalities of conventional guides or rulers. In some implementations, the customized drawing guide may be configured to replace any default or globally set ruler guide or other guide associated with the additional artboards. In some implementations, the customized drawing guide may function with (or in addition to) other guides or ruler guides available within a graphic design software application, for example.

Conventional systems configure guides and rulers as a global setting, meaning that guides are configured based on the absolute position of an entire canvas (e.g., electronic design document) rather than based on a (contextual) position associated with a particular artboard or object, for example. In such systems, a user configures a drawing guide based on a particular position from the overall application (e.g., from an application ruler guide), and since the canvas is typically movable, the conventional guide may not move with the canvas because the conventional guide is set at a global level rather than contextually set at a local level with the artboard.

The systems and techniques described herein may generate and store drawing guides at a local (e.g., canvas, artboard, object, etc.) level, rather than as a global setting (i.e., a ruler guide configured for all application content at a global application level). Generating and storing guides for artboards at a local level may ensure that a context, location, and configuration for the guides is transferable when the artboards are reordered, moved, and/or duplicated within the canvas (or within other files or designs). In addition, generating drawing guides for artboards at a local level may also ensure that any customized drawing guides (generated at the local level) are not overridden by a global guide setting, unless a user chooses to override such guides.

Moreover, the systems and techniques described herein can ensure that a canvas and any associated artboards, for example, can be moved with contextual guide settings if a user were to modify a workflow order of the canvases and/or artboards. Without contextual guide settings (as is typical in conventional systems), the user would be forced to re-configure each guide (and associated settings) upon moving each particular artboard within the workflow. In addition, without contextual guide settings, the user may be forced to manually align objects across different artboards when settings are lost because of a reorder of content and/or artboards.

Additionally, the systems and techniques described herein advantageously improve existing technology areas. For example, as described in detail below, guides generated based on the context of where the user is currently working can provide a more efficient and convenient approach to designing computer graphic content with convenient reuse (and simultaneous replication) of guide-based settings.

FIG. 1A is a block diagram of a system 100 for performing the techniques described herein. In particular, system 100 may provide the capability of creating (e.g., generating) local guides for any number of electronic documents and/or artboards so that users can rearrange the canvases and/or artboards without losing drawing guide (e.g., alignment guide) settings. In addition, system 100 can enable reuse of existing guides. The system 100 may be used to generate contextually relevant guides that provide intuitive editing of graphics and objects within design documents, for example.

As shown in FIG. 1A, the system 100 includes a computing device 102 having at least one memory 104, at least one processor 106, and at least graphic design application 108. The system 100 also includes one or more systems and/or algorithm modules, such as graphics analysis system 110, guide generator/editor 112, an artboard/canvas generator 114, an input detector 116, and a smart guide generator/editor 118.

In general, the computing device 102 may communicate with one or more other computing devices, over a network (not shown). The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network or plurality of networks.

In some implementations, the computing device 102 is a client device. Device 102 may be communicably coupled to one or more other devices (not shown) via wireless, wired, or other networked connection. In some implementations, the computing device 102 is a server device that provides output to a number of client devices operating instances of graphic design application 108, for example.

The processor 106 may represent two or more processors on the computing device 102 executing in parallel and utilizing corresponding stored instructions using memory 104. In some implementations, the at least one processor 106 may be a specialized processor, e.g. a graphics processing unit (GPU). The memory 104 may represent a non-transitory computer-readable storage medium. Similarly, the memory 104 may represent one or more different types of memory utilized by the computing device 102. In addition to storing instructions, which allow the at least one processor 106 to implement disclosed embodiments, the memory 104 may be used to store data, such as artboards/canvases 120, guides 122, and/or graphics content 124. The memory 104 may also be used to store processes, systems, and modules, such as graphics analysis system 110, guide generator/editor 112, artboard/canvas generator 114, input detector 116, and/or smart guide generator/editor 118.

In operation, the system 100 may be used to generate, select, edit, copy, and delete standalone custom drawing guides (e.g., drawing guide 134 and drawing guide 136) on a drawing canvas shown in user interface 126. For example, within the drawing canvas of user interface 126, any number of artboards (e.g., artboard 130) may be provided. The system 100 may provide indicators (e.g., guide handle indicators such as indicators 138 and 142) that indicate that the at least one drawing guide is editable (e.g., changeable, selectable movable, delete-able, etc.). If a user wishes to generate or move a drawing guide, the user may hover over an artboard edge and then select, drag, and release a drawing guide from the selected edge of the artboard (e.g., artboard 130) using the indicator resting at one of the edges of the artboard, for example. The artboard 130 is shown with a user hovering a cursor over a left edge of the artboard, as shown by hover indicator 132.

In some implementations, the gesture may not be a hover gesture. Instead, the gesture may include gestures associated with touchscreens, touchpads, mobile devices, stylus devices, etc. For example, if the user wishes to generate or move a drawing guide, the user may perform a touch gesture on a touch device to generate a guide via tapping or double tapping of an edge of an artboard. Other input gestures are of course possible.

Although drawing guides are shown generated from particular edges in the drawings depicted in this disclosure, any side of an artboard may be used to trigger generation of a drawing guide for the artboard. In addition, any side of a selected artboard may be used to generate a drawing guide. If multiple artboards are selected when a user generates a guide on a single artboard, the system 100 may also generate the same (or similar) drawing guides for each selected artboards.

The system 100 may display drawing guide position indicator values (e.g. location within an artboard) without having to reference a ruler user interface, for example. In addition, the system 100 may provide distance values indicating a distance of a particular guide from neighboring drawing objects (or from other guides). In some implementations, settings may be associated with custom guides. Such settings may be edited within a property inspector associated with a particular guide or other content in an artboard, for example.

The system 100 may enable users to generate guides contextually. For example, the user may no longer need to travel a cursor all the way to the edge of the software application user interface to drag a drawing guide and place it on an artboard. Allowing drag and select at the artboard level, rather than at the application user interface level may simplify the usability of drawing guides.

In some implementations, the system 100 may remove traditional rulers (e.g., ruler guides) from a workspace so that users may be provided a larger workspace in which to generate content. In addition, the use of contextually based guides can provide users with a holistic view on guides across all artboards. Users can assess alignment of an object across any number of artboards. Users can also generate guides that align across all open artboards.

The drawing guides provided by system 100 may be customized and reusable. Reusing drawing guides from one artboard to another artboard (or many artboards) can ensure that users may generate drawing guides for all selected artboards at the same time and each drawing guide will appear in the same location in the selected artboards. In some implementations, the system 100 may be used to generate custom drawing guides that may be selectable as a reusable symbol or layout grid, for example.

The graphic design application 108 can be any editor capable of allowing vector drawing. As used herein, vector drawing can include two-dimensional and three-dimensional vector drawing. Graphic design application 108 can be any suitable digital media editor configured to edit vector drawings. Examples of digital media editor can include ADOBE® Illustrator, ADOBE® Photoshop, ADOBE® InDesign (all available from Adobe Systems, Inc. of San Jose, Calif.), or any other suitable digital media editor. In general, the graphic design application 108 may generate and/or update drawing guides (e.g., alignment guides) using the guide generator/editor 112 and/or smart guide generator/editor 118.

A user may access the graphic design application 108 on device 102. The graphic design application 108 may provide analysis of vector graphics and document content using the graphics analysis system 110. For example, the graphics analysis system 110 may be implemented with at least one computing device configured to process graphics within electronic documents.

In operation, a user may access the graphic design application 108 to generate and edit drawing guides and/or to generate and edit objects (e.g., graphics, images, document content, etc.) using graphics analysis system 110, guide generator/editor 112, artboard/canvas generator 114, input detector 116, and/or smart guide generator/editor 118, among other things.

The guide generator/editor 112 may function to generate and edit drawing guides for system 100 when system 100 determines that such drawing guides should be displayed for particular artboards. For example, the smart guide generator/editor 118 may be controlled and generated at the artboard container level when a user accesses graphic design application 108 to generate one or more drawing guides. The artboard/canvas generator 114 may function to create artboards and canvas documents in the system 100. The input detector 116 can detect input in an artboard or canvas from a keyboard and/or a pointing device (e.g., a mouse or a trackball, controller, mobile device, etc.). In some implementations, the guide generator/editor is configured as a tool to replace rulers and/or ruler guides associated with application 108.

The smart guide generator/editor 118 may generate and/or edit smart guides associated with artboards. For example, the smart guide generator/editor 118 may be controlled and generated at the artboard container level. In some implementations, the smart guides described herein can utilize and/or access both conventional ruler guides, while being able to generate new contextual guides at the artboard level that are transferable across multiple artboards, for example. However, since typical implementations of conventional ruler guides take real estate away from an active workspace on a screen, as a result of typically being overlaid on top of the user's viewport, the drawing guide generator/editor 112 and the smart guide generator editor 118 may generate guides at the artboard container level. This may force users to toggle rulers off in order to reclaim active workspace.

The smart guide generator/editor 118 may automatically measure a distance between objects (or between drawing guides) without using ruler guides. Thus, in some implementations, the smart guide generator/editor 118 may generate smart drawing guides that may replace ruler guides. In some implementations, the smart guide generator/editor 118 may be a tool that replaces the ruler in particular applications. This may provide an advantage of ensuring that the smart drawing guides use a minimal amount of space in the active workspace. The smart drawing guides described herein may provide the capability of creating local drawing guides for each canvas so that users can rearrange the canvas freely and reuse existing drawing guides. In addition, artboard edges (e.g., such as edge 208) would typically be closer to user-generated content in a workspace than the ruler guide would be. Thus, the artboard edge may provide a more convenient guide to use than the ruler guide.

Figure 1B:
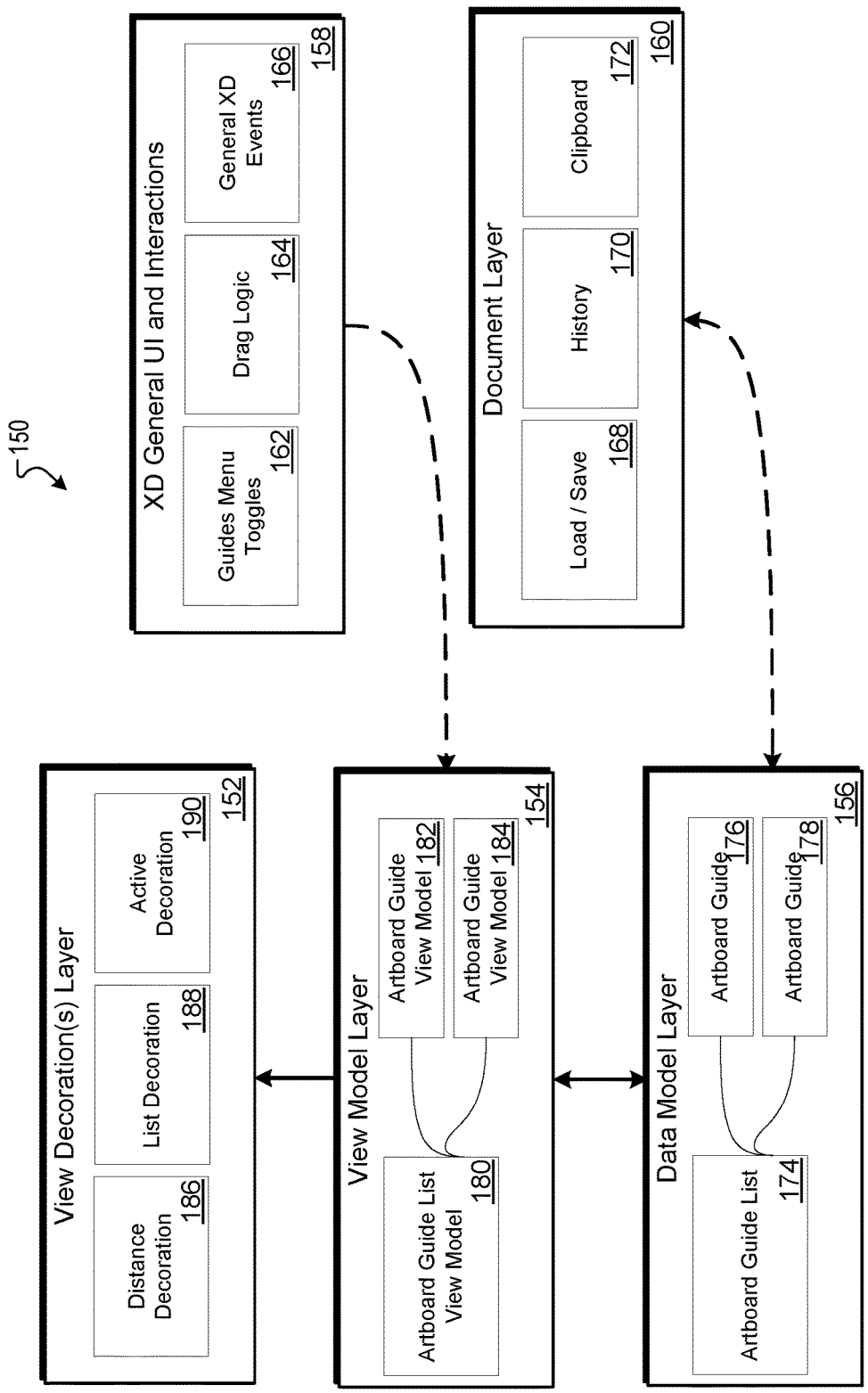

In some implementations, the system 100 may utilize any or all functionality associated with grid decoration, scene graph grids, and/or grid pane views, as shown in detail in FIG. 1B. For example, the system 100 may be used to generate custom guides as scene graph elements of an existing grid feature.

Each element 108-118 may have access to memory 104, processors 106, artboards/canvases 120, guides 122, and/or graphics content 124. The artboards/canvases 120, guides 122, and/or graphics content 124 may be user-defined, user-generated, imported from other media, and/or system generated by the systems described herein.

In operation, a user may access graphic design application 108 to be provided a user interface, such as the user interface 126. The graphic design application 108 may be accessed by a user to generate, edit, or otherwise modify vector graphics, document elements, drawing guides, and/or image content. For example, a user may generate or upload a number of images and/or document content. The user can generate a drawing guide using the drawing guide generator/editor 112 and/or smart guide generator/editor 118.

FIG. 1B is an example depicting additional architecture 150 associated with system 100. In some implementations, some or all of system 150 is integrated into the guide generator/editor 112. In some implementations, the system 150 communicates (or has access to) system 100. In some implementations, the system 150 is integrated into computing system 102.

The system 150 includes a view decorations layer 152, a view model layer 154, a data model layer 156, an XD general UI and interaction layer 158, and a document layer 160. The layer 158 may provide information to the view model layer 154. For example, the XD general UI and interactions layer 158 includes a guides toggle menu 162, drag logic 164, and general XD events 166. The guides toggle menus 162 may communicate a command to the computing device 102 based on a user-selected show, enable, or disable guide selection to show, enable, or disable guides in a container (e.g., artboard) associated with the user selection. Similarly, drag logic 164 may include commands that system 100 may use when receiving user input (cursor drag motions) for a particular artboard. General XD events 166 may include shape move, shape resize, and/or shape rotate, etc. commands that system 100 can carry out for a particular artboard. Other inputs that do not include drag logic 164 and/or release inputs are possible.

The document layer 160 includes a load/save module 168, a history module 170, and a clipboard module 172. Each module 168-172 can function on elements of the data model layer 156. The data model layer 156 includes an artboard guide list 174, and one or more artboard guides 176, 178. Each artboard in the artboard guide list 174 may be associated with a particular load/save description module 168, history module 170, and clipboard module 172.

The data model layer 156 may provide information to the view model layer 154. For example, elements (e.g., artboard guide list view model data 180, artboard guide view model data 182, 184) may be displayed in the artboard guide list may be retrieved by the view model layer 154 from the data model layer 156.

The view model layer 154 may provide information to the view decorations layer 152 via guide generator/editor 112. For example, the view model layer 154 may provide labels indicating distance (e.g., pixels, percentages, points, etc.) using a distance decoration 186 to indicate information in the UI of graphic design application 108, for example. Other decorations are possible, as indicated by list decoration 188 and active decoration 190. The list decoration 188 may be used to provide labels to lists within the UI of graphic design application 108. Similarly, the active decorations 190 may be used to move content according to position changes detected at a cursor or object in the UI of graphic design application 108.

One example operation of system 150 may include detecting a cursor movement in the UI (e.g., an artboard) of graphic design application 108. The coordinates of the cursor may be determined and converted to canvas coordinates associated with an open canvas of graphic design application 108. The determination and conversion may be performed by XD general UI and interactions layer 158 using the view model layer 154 and any information gathered from document layer 160 and/or data model layer 156.

The system 150 may test the coordinates against all active nodes of a decoration tree associated with the artboard. In the decoration tree, system 150 may draw each guide list (e.g., guide list 174) with a stroke width of one and in a particular color to indicate an inactive guide or edge. If the system 150 determines that a particular guide or edge is selected or moving, the system 150 may provide indications that the guide or edge is active. Example indications that the guide is active may include an increased stroke width and a transparency.

If the system 150 determines that an artboard guide list is impinged upon (or crossed vertically or horizontally), the view decorations layer may generate a decoration such as a handle to indicate that the guide is active and moveable. The handle may also indicate that a drag mode has been activated by system 150. When the handle is depicted and the drag mode is activated, the system, 150 ensures that the drag mode and associated elements will receive all cursor movement events and may act on such events accordingly.

System 150 may utilize drag logic 164 to search for a closest guide (to a current object or guide) based on the position of the cursor. If the cursor is outside of the artboard, a new artboard guide may be generated in a corresponding artboard guide list view model (not shown). Thus, artboard guide list view model data 180 is for a first artboard while the new artboard guide would be associated with a second artboard and a second artboard guide list view model (not shown). The second artboard guide list view model is a second instance and latest generated instance, thus that artboard container is marked active.

In the event that the cursor is moved, the second artboard guide view model instance undergoes a change in position based on the cursor movement. Whenever an artboard guide view model instance becomes active, the system 150 uses a decoration module from view decoration layer 152 to remove the instance from the artboard guide list 174 and reassign the instance to an artboard guide active decoration 190, for example. Decoration 190 may await detection of any position changes and may move a single line according to any detected position changes.

When the cursor is released, the drag mode may set the artboard guide view model (e.g., 184) active property to false. Such a setting may undo the removal and reassignment described above. For example, a decoration from the view decoration layer 152 may redraw the artboard guide list 174 to include the edited guide.

Figure 2:
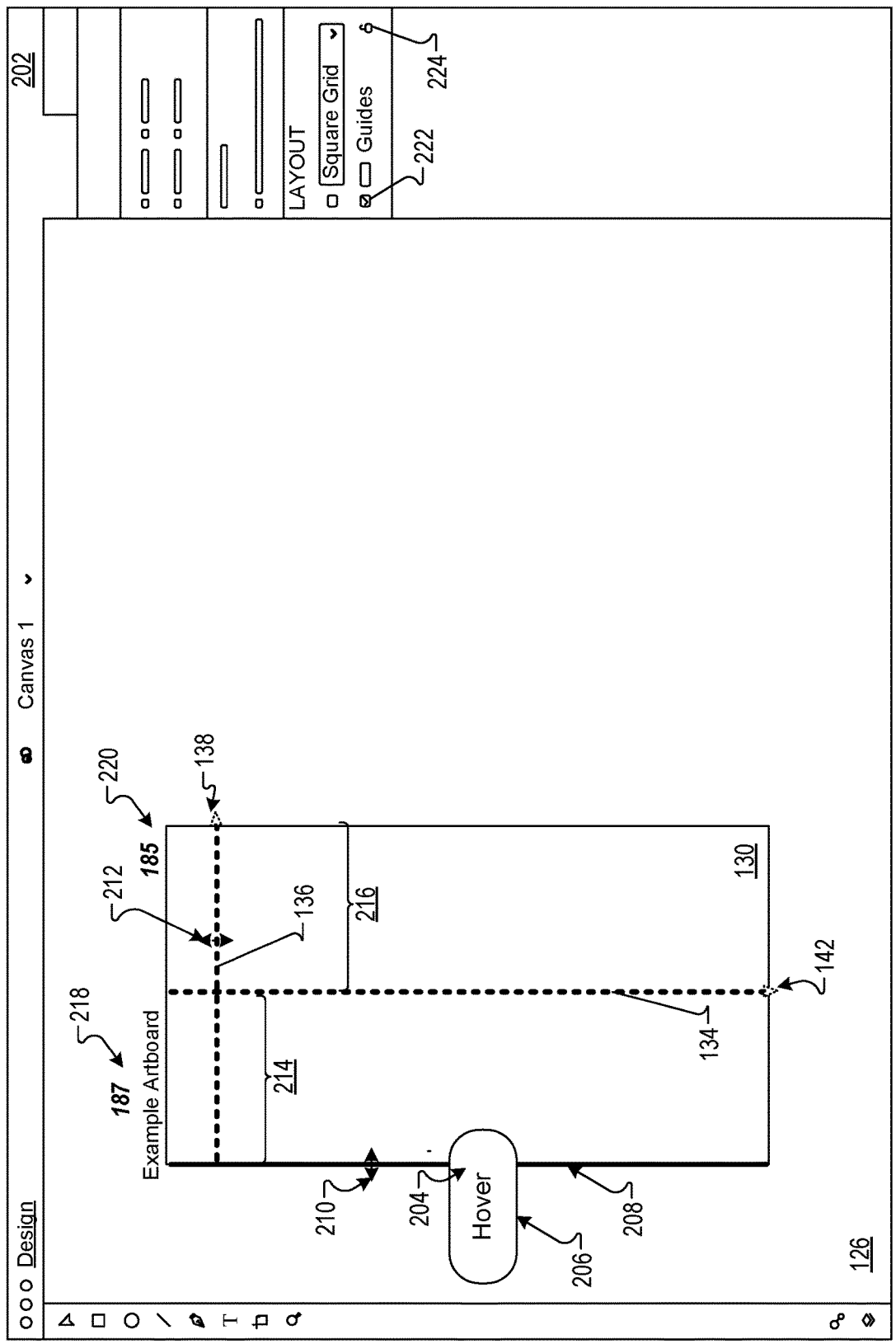
FIG. 2 is a user interface depicting an example design document and an example of contextually generated drawing guides associated with the techniques described herein.

FIG. 2 is a user interface 200 depicting an example design document 202 and an example of contextually generated drawing guides associated with the techniques described herein. The user interface 200 may be generated in an electronic drawing application (e.g., graphic design application 108).

In this example, a user has created a canvas (e.g., an electronic document having a canvas) with an artboard 130. Although only one canvas and one artboard are depicted in the example, any number of canvases, artboards, objects, text, images, and/or other document content may be provided. In this example, a user may use an input device (not shown) to generate one or more drawing guides (e.g., drawing guide 134 and drawing guide 136). The drawing guides 134 and 136 are shown as broken lines to indicate that the user moved the guides from a first location into the present location.

In some implementations, system 100 may generate the environment for generating the drawing guides. For example, a user may access system 100 to begin drawing. The user may use an input device (represented by cursor 204) to hover (indicated by hover action 206) over an edge 208 of the artboard 130. Upon hovering, the system 100 may detect the hover motion (i.e., input) on the edge 208 of the artboard 130. To generate a drawing guide for the artboard 130, the user may drag the cursor from the edge 208 and a drawing guide may appear and be dragged into the artboard 130 as the user continues to move the cursor rightward or leftward. Similarly, the user may generate a horizontal drawing guide using a drag motion from the top edge or bottom edge of an artboard.

In addition, responsive to the detection of a hover input performed by the user, the system 100 may trigger a number of selectable indicators to indicate functionality to the user. For example, indicated functionality may include functionality to configure a drawing guide representing an interactive reference for placing content in the art board. In some implementations, the hover input may trigger for the artboard 130, for example, display of a pixel location indicator (e.g., pixel location indicator 218) depicting a measure of distance (e.g., distance 214) from one or more edges (e.g., edge 208) of the artboard or a measure of distance from one or more drawing objects (not shown).

In some implementations, the indicators modify a look of an object or element (e.g., an artboard edge) associated with (or provided within) the artboard. For example, the system 100 may depict an artboard edge in a different color. Similarly, the system 100 may depict an artboard edge or other element with a different pixel line width. In some implementations, the indicators may include guide handle indicators (e.g., indicators 138 and 142) that indicate that the at least one drawing guide is editable. In some implementations, the indicators include a direction indicator depicting two or more directions in which the at least one drawing guide is movable. For example, indicators 210 and 212 each indicate two directions in which respective drawing guides 134 or 136 may be moved within artboard 130. In particular, if the user wishes to move (or create) a drawing guide, the user may hover over an edge or indicator to select, drag, and release a drawing guide within the artboard 130. For example, the user may hover, select, and drag the indicator 210 and release the indicator 210 at the location shown by vertical drawing guide 134.

In some implementations, an input may define a distance from an edge of the artboard. For example, the user may provide an input to select an edge of the artboard to move a drawing guide (e.g., drawing guide 136) into the artboard 130. In some implementations, the user may instead provide an input to select the edge of the artboard to begin to drag the drawing guide into an artboard. Once the input is detected by the system 100, the system 100 may trigger the at least one drawing guide for display at the determined location (e.g., at a release point). The defined distances between edges of the artboard (e.g., distance 214 and distance 216) may be shown near or within the artboard 130, as pixel indicators (e.g., pixel location indicators [187] 218 and [185] 220).

Other pixel location indicators (or other unit of location) may be shown, for example with respect to other drawing guides within the artboard. In some implementations, the user may instead select upon an existing drawing guide and perform an input to move the existing drawing guide. Whether the user selects upon an existing guide or wishes to generate a new guide by selecting an edge of the artboard 130, an existing or new drawing guide may be configured to change from a first opacity to a second opacity in which the first opacity value is higher than the second opacity value. For example, the drawing guide 134 may change from a 100 percent opacity value (e.g., fully visible) triggering detection of the selection and/or drag input to a 50 percent opacity value triggering detection of the release input (50 percent transparent).

In some implementations, other user interface changes may occur when the user interacts with an artboard. For example, if a user is currently dragging a drawing guide onto an artboard, the distance of the drawing guide from both edges of the artboard may be displayed. At the same time, the artboard name may dim to 25 percent transparency to indicate that artboard is being worked upon. In addition, font size for the displayed distances may remain the same regardless of zoom in and out of a particular artboard or canvas.

A guide setting 222 may be provided to enable or disable display of the drawing guides within a particular artboard (or all artboards). In addition, a drawing guide lock setting 224 may be provided to enable or disable movement or modification of drawing guides.

Figure 3A:
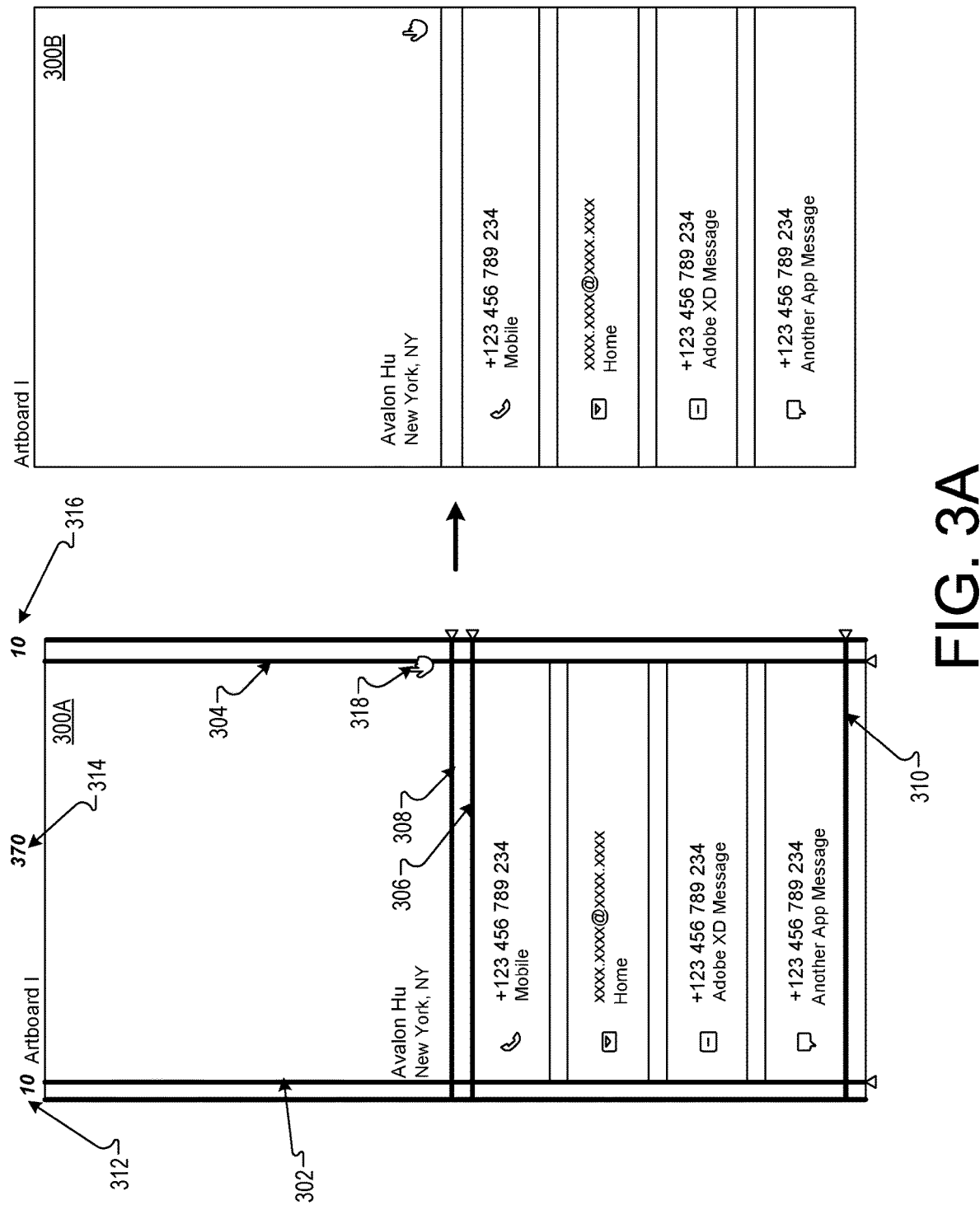
FIG. 3A is a user interface depicting example artboard settings with example drawing guides associated with the techniques described herein.

FIG. 3A is a user interface depicting example artboard settings with example drawing guides associated with the techniques described herein. In this example, an artboard 300A is shown with drawing guides enabled and editable. For example, a user may have selected to enable guide setting 222 to allow viewing of the drawing guides (e.g., drawing guide 302, drawing guide 304, drawing guide 306, drawing guide 308, and drawing guide 310). With the drawing guides enabled, the user interface depicting artboard 300A shows pixel location indicators [10] 312, [370] 314, and [10] 316 indicating a pixel location from at least one edge of the artboard 300A. Other pixel location indicators are possible, but have been omitted for clarity purposes. As shown in artboard 300A, a number of guide handle indicators that indicate that the guides are editable. In addition, a cursor 318 is depicted indicating a location of the last cursor movement.

At some point in time, the user may wish to view artboard content without the drawing guides and may do so by deselecting (or disabling) the guide setting 222 (FIG. 2), for example. Artboard 300B is the result of disabling the guide setting 222 on artboard 300A. As shown in artboard 300B, all drawing guides are invisible to the user accessing the artboard 300B.

Figure 3B:
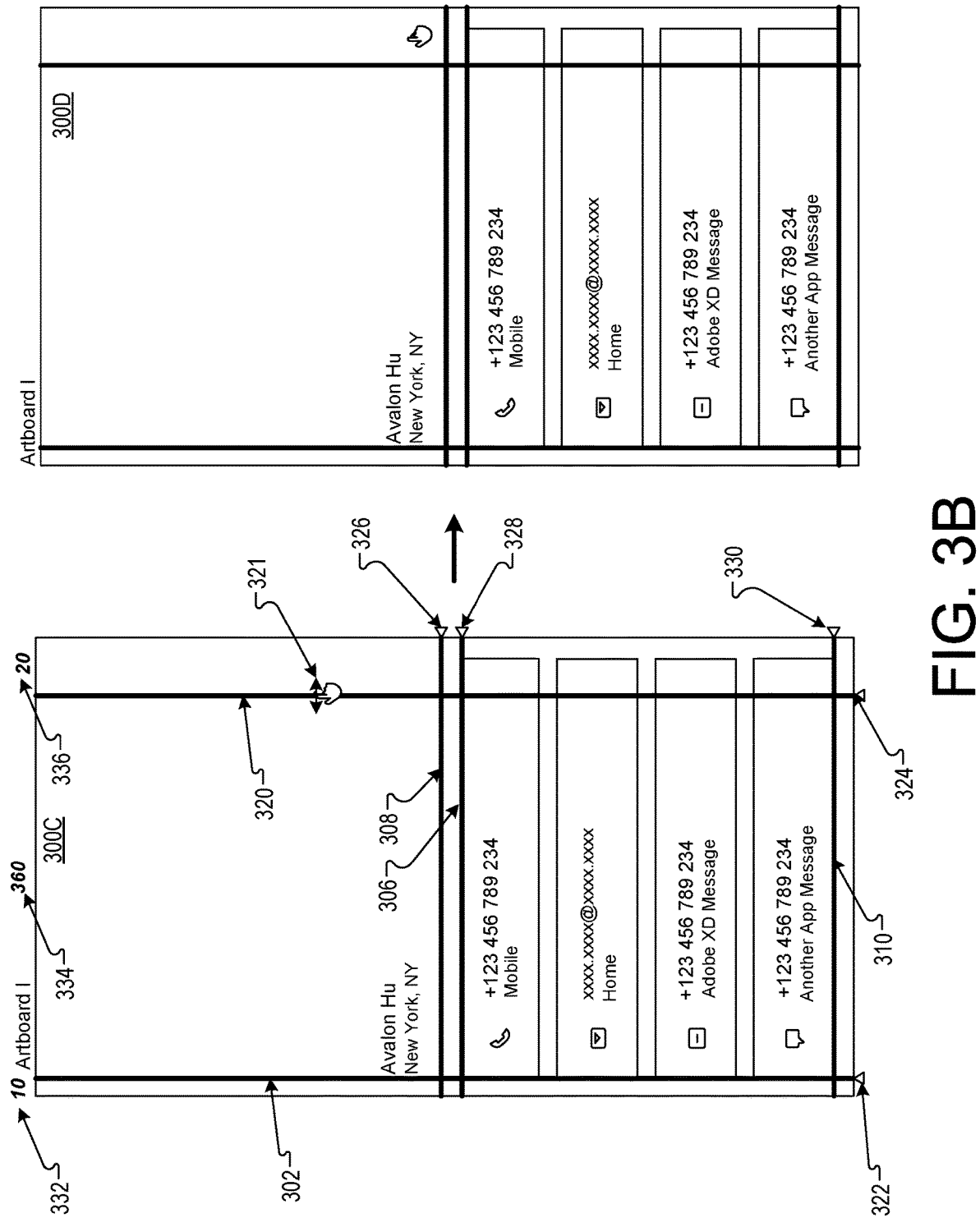
FIG. 3B is a user interface depicting example artboard settings indicating locked drawing guides.

FIG. 3B is a user interface depicting example artboard settings indicating locked drawing guides. In this example, the drawing guides 302, 306, 308, 310, and new drawing guide 320 are shown in artboard 300C. Here, the user selected indicator 321 to generate and/or move the drawing guide 320. Each drawing guide in artboard 300C is editable, as indicated to the user by respective guide handle indicators (shown by triangle guide handle indicators 322, 324, 326, 328, and 330). With the drawing guides enabled and editable, the user interface depicting artboard 300C shows pixel location indicators [10] 332, [380] 334, and [20] 336 indicating a pixel location from at least one edge of the artboard 300C.

At some point in time, the user may wish to lock the drawing guides from movement or editing and may do so by enabling the guide setting 224 (FIG. 2), for example. Artboard 300D is the result of disabling the guide setting 224 on artboard 300C. As shown in artboard 300D, all drawing guides are locked because all guide handle indicators 322, 324, 326, 328, and 330 have been removed from view.

Figure 4A:
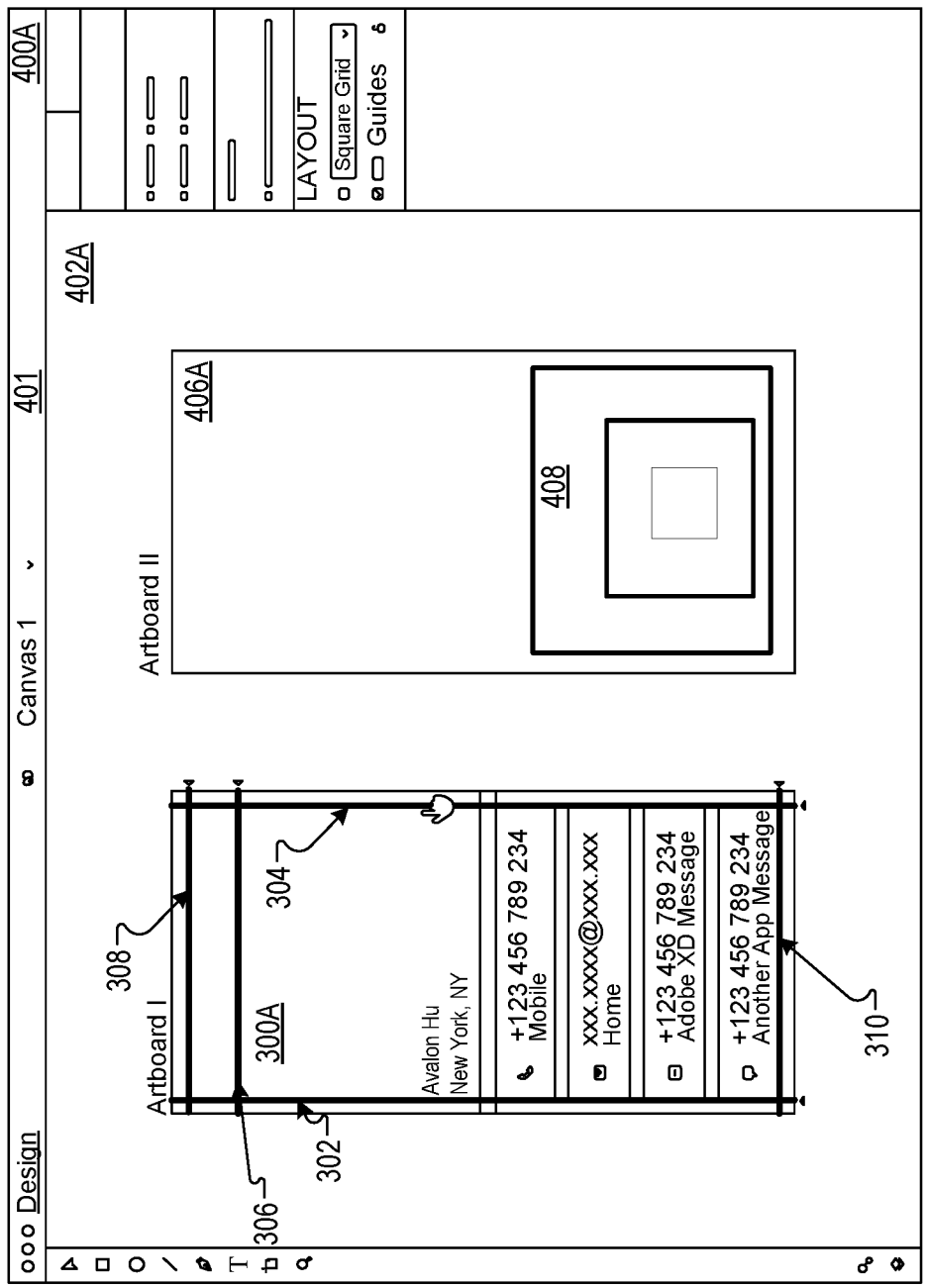
FIG. 4A is a user interface depicting an example design document and an example new art board with drawing guide content.

FIG. 4A is a user interface 400A depicting an example design document 402A and an example new art board 406 with drawing guide content. The user interface 400A depicts a drawing canvas 401 with open artboards 300A and 406A. The artboard 300A is shown with a number of editable drawing guides 302, 304, 306, 308, and 310. A user may wish to create a new artboard. In the depicted example of FIG. 4A, the user has created new artboard 406A and added content 408. The user may have generated or used drawing guides 302-310 when working with artboard 300A (or another artboard) and may wish to copy the drawing guides 302-310 to the new artboard 406A.

Figure 4B:
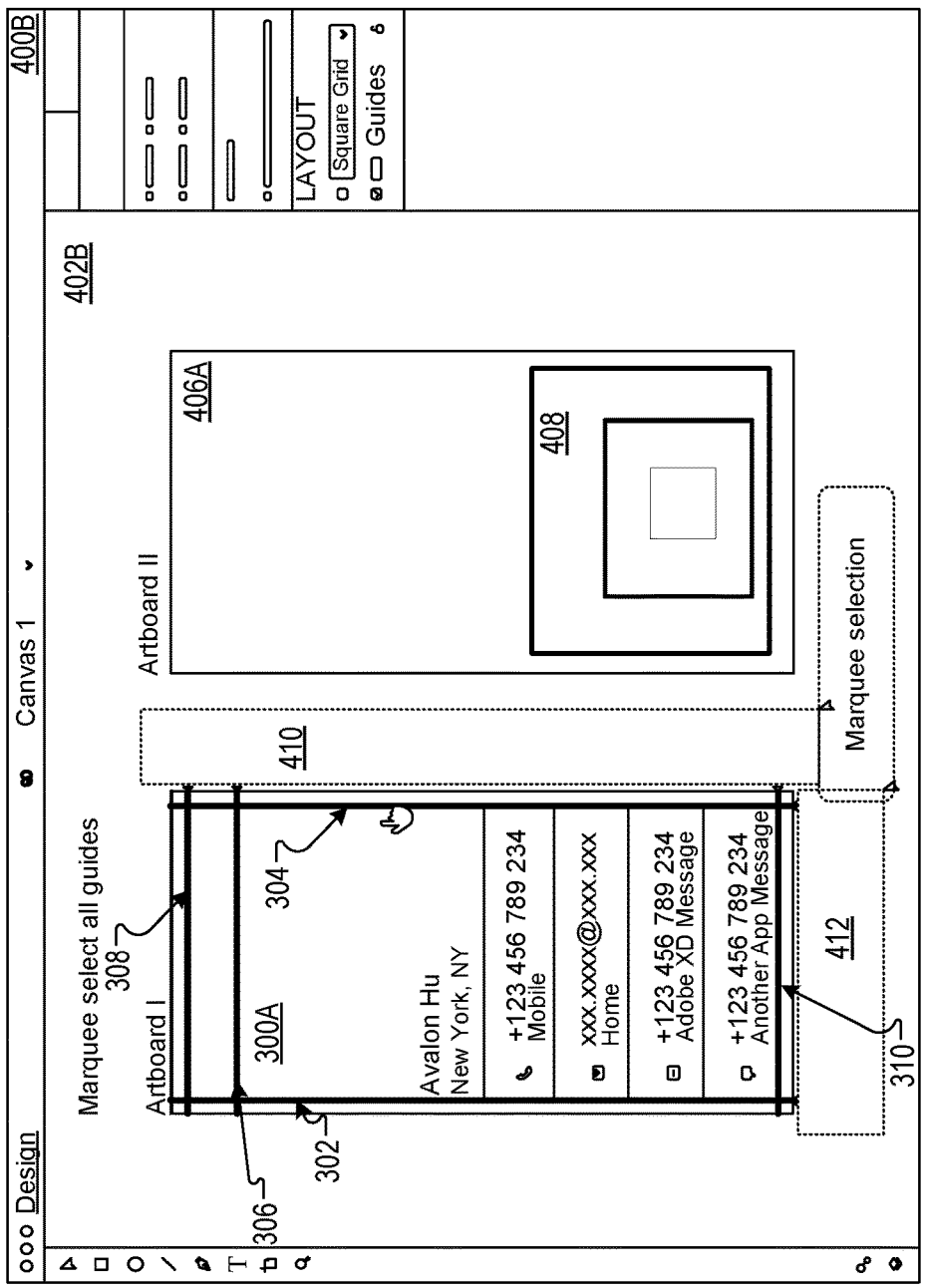
FIG. 4B is a user interface depicting an example design document and a marquee selection associated with an artboard.

FIG. 4B is a user interface 400B depicting an example design document 402B and a marquee selection (selections 410 and 412) associated with artboard 300A. The marquee selection may be performed to modify one or more drawing guides. In some implementations, the marquee selection may be performed to move one or more drawing guides. In yet other implementations, the marquee selection may be performed to delete one or more drawing guides. In yet other implementations, the marquee selection may be performed to copy one or more drawing guides to one or more other artboards, drawing canvases, files, applications, etc. In some implementations, the user may use a cursor to perform the marquee selections. In some implementations, the user may use keyboard shortcuts to perform marquee selections individually (e.g., using hold/shift on each desired drawing guide).

In general, a marquee selection may be performed by selecting one or more guide handles (e.g., triangles with selections 410 and 412). The guide handles may be located outside of the artboard workspace to ensure that selection of guides does not interfere with object/content selection on the artboard.

Figure 4C:
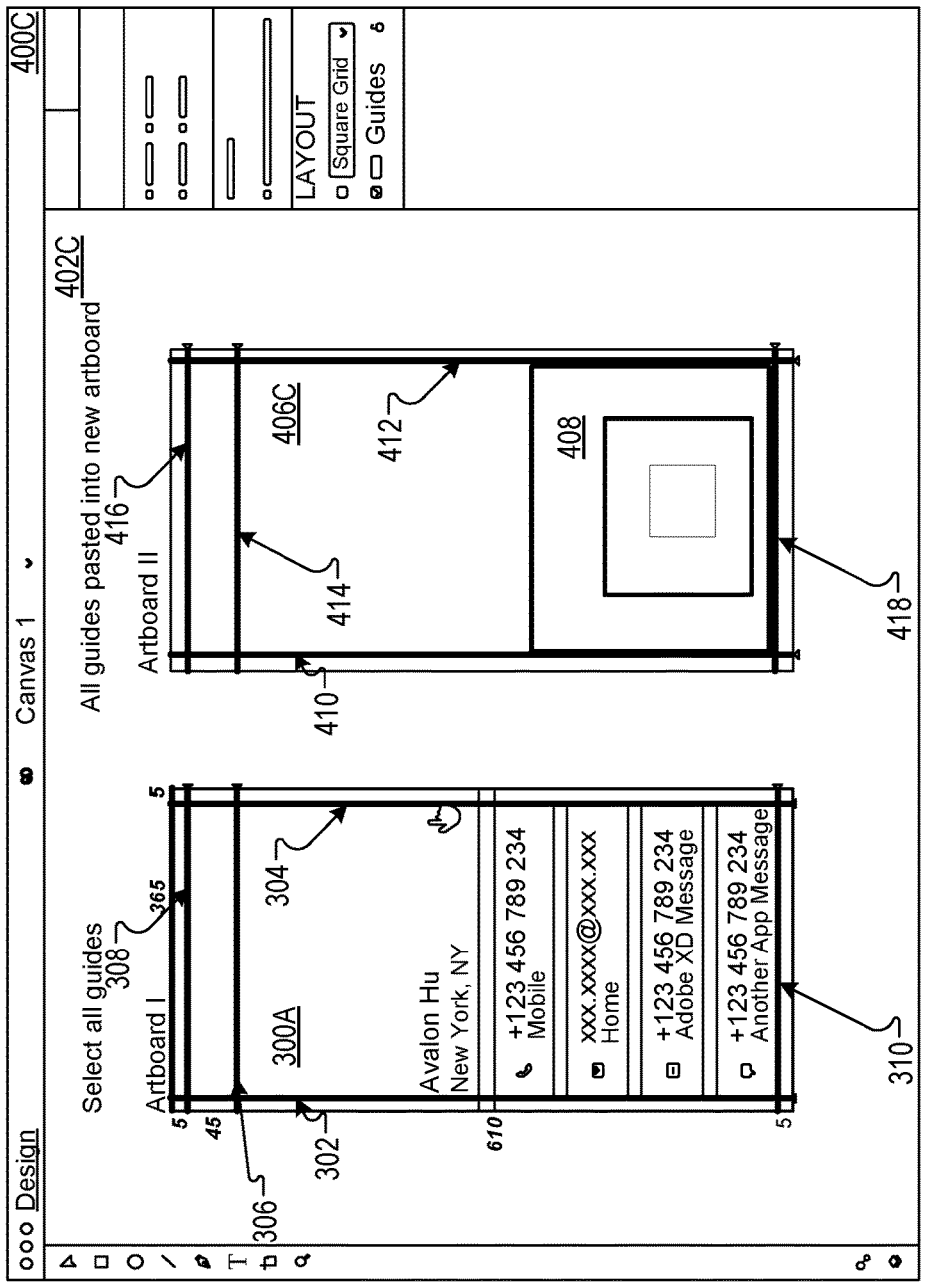
FIG. 4C is a user interface depicting an example design document and a duplication of drawing guides in a new artboard.

FIG. 4C is a user interface 400C depicting an example design document 402C and a duplication of drawing guides in a new artboard 406C. For example, each drawing guide 302-310 is selected and copied to artboard 406C, as shown by new drawing guides 410, 412, 414, 416, and 418. The user may have used keyboard shortcuts (e.g., command C/command V) to provide commands to copy and paste the drawing guides. Other copy mechanisms are possible.

In general, each drawing guide associated with a particular artboard is selectable using a marquee selection tool (or other tool) and is configured with copy-and-paste functionality to receive commands to be copied from a first artboard and pasted to another artboard associated with a particular electronic drawing canvas. In some implementations, one or more of the drawing guides may be copied from an artboard and pasted into a plurality of additional artboards generated in the drawing canvas. In some implementations, the drawing guides may be copied from an artboard associated with a first canvas and may be pasted into artboards associated with another canvas. In general, the drawing guides may be stored as a default drawing guide for a particular artboard (or for a plurality of additional artboards) and if the user wishes to reorganize the artboards, the settings of the drawing guides can remain intact. That is, when artboards are reorganized within a drawing canvas, configuration settings of the drawing guides for the artboard(s) are retained and reusable. In addition, the algorithms described herein may be configured to enable or suppress alignment drawing guides to provide the user with ease of use and reuse of such drawing guides.

Figure 5A:
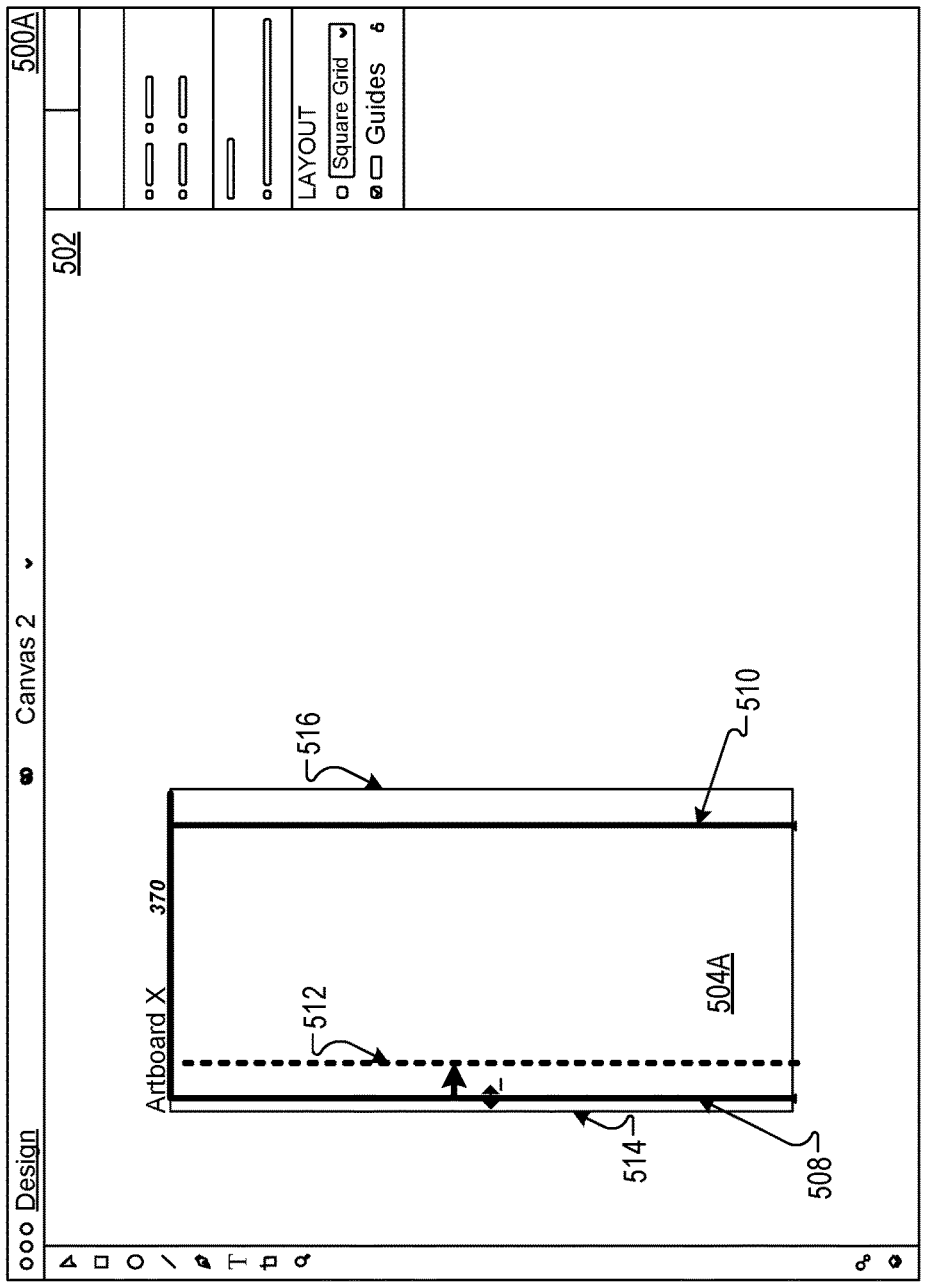
FIG. 5A is a user interface depicting an example design document and smart drawing guides associated with the techniques described herein.

FIG. 5A is a user interface 500A depicting an example design document 502 and smart drawing guides associated with the techniques described herein. An artboard 504A is shown with a first drawing guide 508 and a second drawing guide 510. The drawing guides 508 and 510 may be smart drawing guides that may be generated for display to assist a user in placement and alignment of drawing content on a drawing canvas. The smart drawing guides may be provided on a per artboard basis and may be configured for each individual artboard by a user. In some implementations, the smart drawing guides may be generated and/or configured for one artboard and copied to other artboards, as discussed above with respect to FIGS. 4B and 4C. In some implementations, smart drawing guides may be generated simultaneously for each open artboard as the user generates the guides.

In operation, system 100 may receive user direction to generate the drawing guide 508 and/or drawing guide 510 based on a hover, select, and drag movement performed by the user, for example. The system 100 may then detect that a user is moving the guide 508 in a rightward direction. Upon the detection, the system 100 may detect the input and detect a distance between the moving drawing guide 512 and an edge 514 of the artboard 504A. In addition, the system 100 may determine when equal spacing is detected between 1) the edge 514 of the artboard 504A and the drawing guide 512 and 2) the edge 516 and the drawing guide 510. Upon detecting such equal spacing between a respective closest side of the artboard 504B, the system 100 may generate an indication of the matching distance, as shown in user interface 500B of FIG. 5B.

In some implementations and in response to detecting the hover, select, and drag input on any drawing guide, the system 100 may increase a line width associated with the particular guide(s) to indicate that moving the guide may move both the first drawing guide and the second drawing guide at the same time and over the same distance. For example, a drawing guide may be generated on a left side of an artboard and the system 100 may mirror the drawing guide on the right side of an artboard.

Figure 5B:
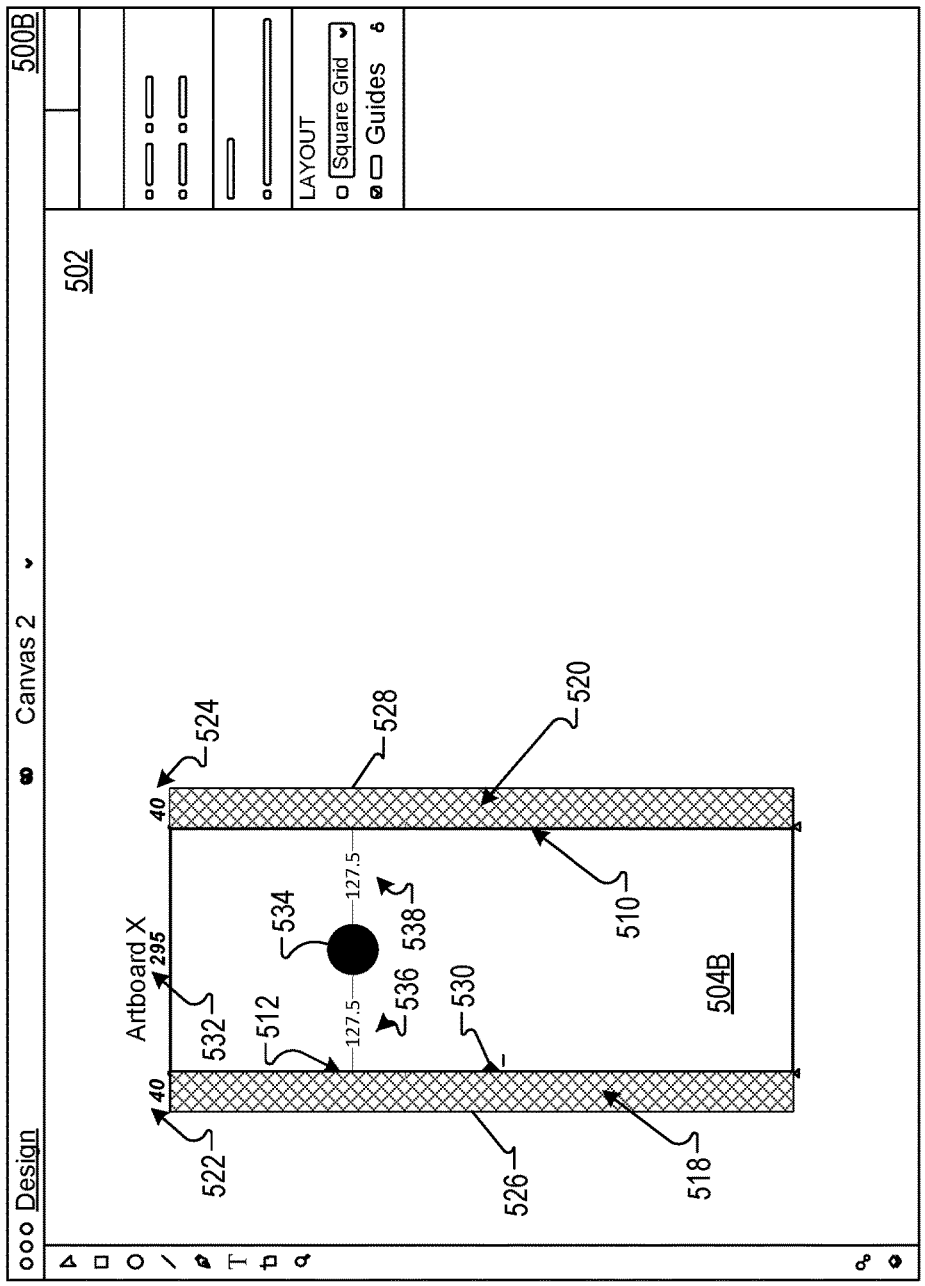
FIG. 5B is a user interface depicting an example design document and another example of smart drawing guides associated with the techniques described herein.

FIG. 5B is a user interface 500B depicting an example design document 502 and another example of smart drawing guides associated with the techniques described herein. In response to detecting the matched spacing between edges of an artboard and respective drawing guides, the system 100 may generate a shading, coloring, outline (or other indication) 518, 520 to indicate that the distances match. In addition, pixel location indicators 522 and 524 depict the same value, which provides another indication that the drawing guides 510 and 512 are equidistant from respective edges of the artboard.

In a similar fashion, the system 100 may provide smart drawing guides to indicate equal spacing from particular objects, text, and/or other content. A user may utilize such smart drawing guides to snap the guides to one or more drawing objects with equal spacing relative to a distance between the first drawing guide 512 and the second drawing guide 510. In some implementations, the user may instead drag the particular content to snap the content to the drawing guide(s) 510, 512.

In some implementations, the system 100 may enable the user to drag and release content and/or drawing guides. If the user wishes to abort the drag of the content and/or drawing guides, the user may select an escape key to cancel the drag motion. Similarly, to cancel a drag (or movement) of a drawing guide, the user may drag the drawing guide to (or beyond) the edge of the artboard and release the guide.

In some implementations, the system 100 may generate and display a first drawing guide 512 for the artboard 504B (associated with the drawing canvas 500B). The first drawing guide 512 may be depicted at a user-selected location in response to receiving a select and drag input associated with the first edge 526 of the artboard 504B. Next, the system 100 may automatically generate the second drawing guide 510 (parallel to the first drawing guide 512). The second drawing guide 510 may be offset a distance from the second edge of the artboard 528. The second drawing guide 510 may be the same width (e.g., distance) of the first drawing guide 512 from the edge of the artboard 504B to the user-selected location (e.g., cursor 530).

In some implementations, the distance may be equal to a distance from the first edge of the artboard 526 to the user-selected location (e.g., 530) and the second drawing guide 510 may be displayed in the artboard while the first drawing guide 512 is displayed. Modifying the first drawing guide 512 may cause the same modification of the second drawing guide 510 at an offset from at least one artboard element. For example, modifying the first drawing guide by moving the guide 10 pixels rightward from the edge 526 would modify the second drawing guide 510 to represent a same distance from the opposite edge 528 such that both guides are the same width. In this example, if the drawing guide 510 were at a rightward most edge, the guide 510 may grow to the width to match guide 512, but may be shifted toward guide 512, thereby shrinking the area between drawing guides 510 and 512.

In some implementations, the artboard element described above may include another drawing guide and the modification may trigger display of a pixel location indicator (indicator 532) indicating a distance of the first drawing guide 512 to the second drawing guide 510 and/or a pixel location indicator indicating a distance of the second drawing guide 510 to an edge (e.g., indicator 522) and/or a pixel location indicator indicating a distance of the first drawing guide to the edge 528 (e.g., 524).

In some implementations, the artboard element described above may include a drawing object and the modification may trigger display of a pixel location indicating a distance (e.g., indicator 536) from the drawing object 534 to the first drawing guide 512 and a pixel location indicating a distance (e.g., indicator 538) from the drawing object 534 to the second drawing guide 510.

In some implementations, the system 100 may provide pixel location indicator values upon detecting a hover motion performed by a user in the user interface. For example, any or all of the values 522, 524, 536, 538 may be provided in the user interface 500B upon detection of the hover motion associated with a drawing guide for the values. In standard operation, such values may or may not be displayed.

Figure 6A:
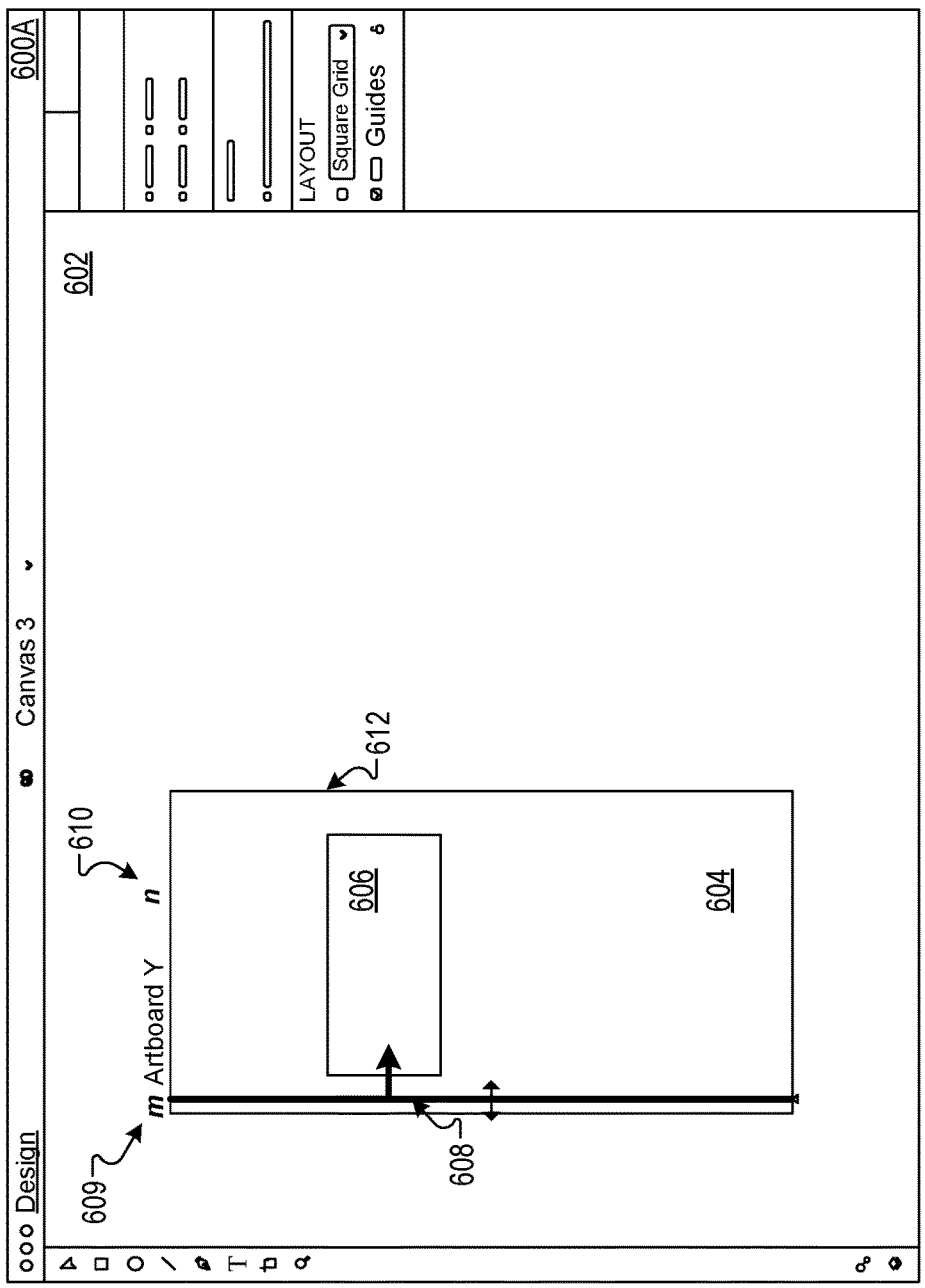
FIG. 6A is a user interface depicting an example design document and a snap to object feature associated with the techniques described herein.

FIG. 6A is a user interface 600A depicting an example design document 602 and a snap to object feature associated with the techniques described herein. As shown, an artboard 604 includes a drawing object 606. The user may wish to snap (e.g., connect) a drawing guide to the drawing object 606. The system 100 may configure drawing guides that may function like another drawing object. As such, guides may be snapped to other content within a particular artboard. In addition, guides may be snapped to other guides.

As shown in FIG. 6A, a user generated a drawing guide 608 and dragged the guide 608 toward drawing object 606. After the drag motion, a location indicator (m) 609 indicates that the displayed guide 608 is a distance from a left edge of the artboard 604. Similarly, a location indicator (n) 610 indicates that the displayed guide 608 is a distance from a right edge 612 of the artboard 604. Other indicators may be shown including an indication of a distance from the drawing guide 608 to one or more edges of the drawing object 606.

Figure 6B:
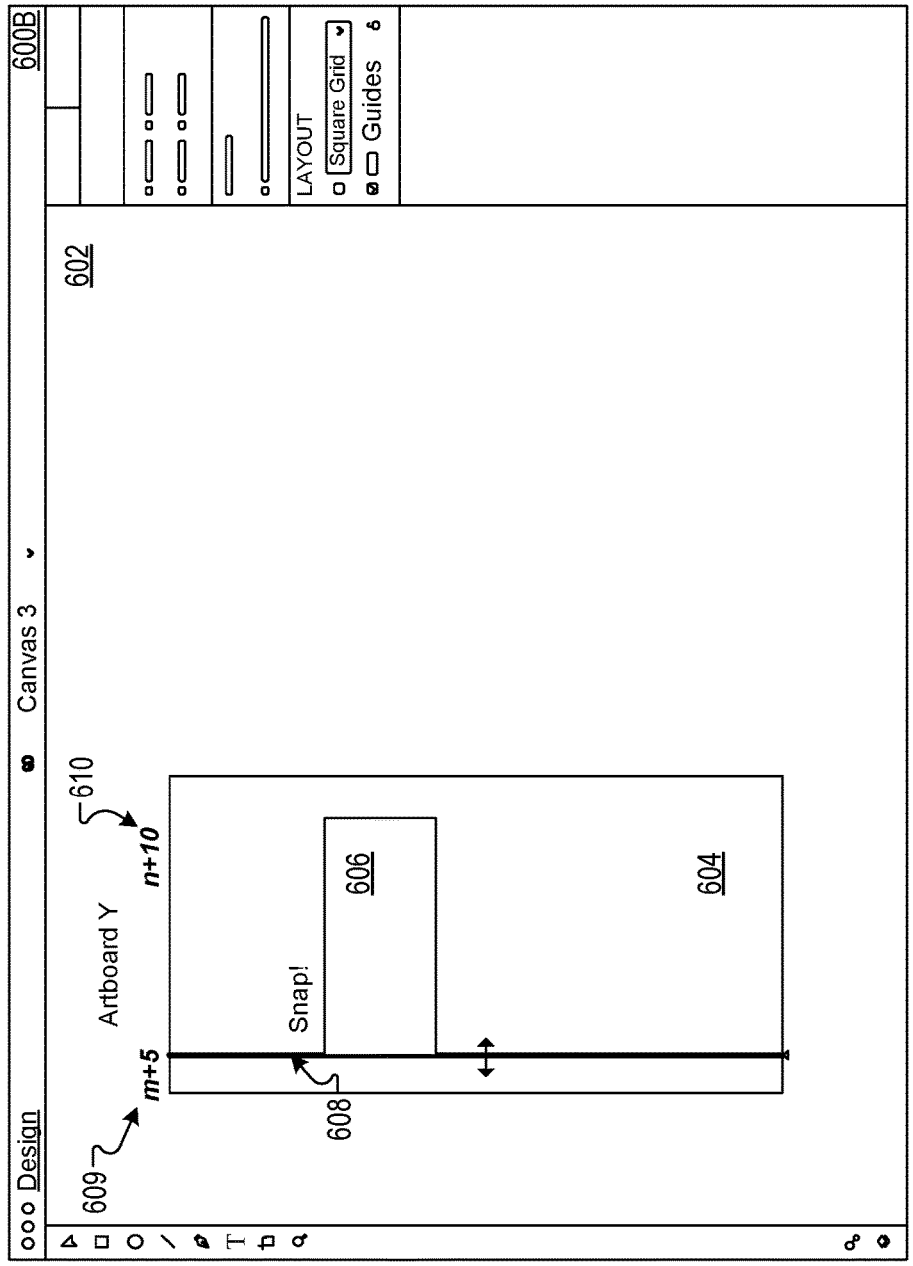
FIG. 6B is a user interface depicting an example design document associated with the snap to object feature of FIG. 6A.

FIG. 6B is a user interface 600B depicting an example design document 602 associated with the snap to object feature of FIG. 6A. Here, the user has moved the drawing guide 608 to snap to the object 606. The pixel location indicators 609 and 610 (FIG. 6B) have been updated to show the movement. Here, the pixel location indicator m 609 is moved five units to the right and thus the indicator 609 (FIG. 6B) is shown with the updated measurement (m+5) 609. Similarly, indicator 610 is updated to show movement of (n+10). Additional drawing guides may be snapped to object 606. Although variables are used in this example, any unit of measure may be used to indicate locations of guides and/or objects within the artboards described herein.

Figure 7A:
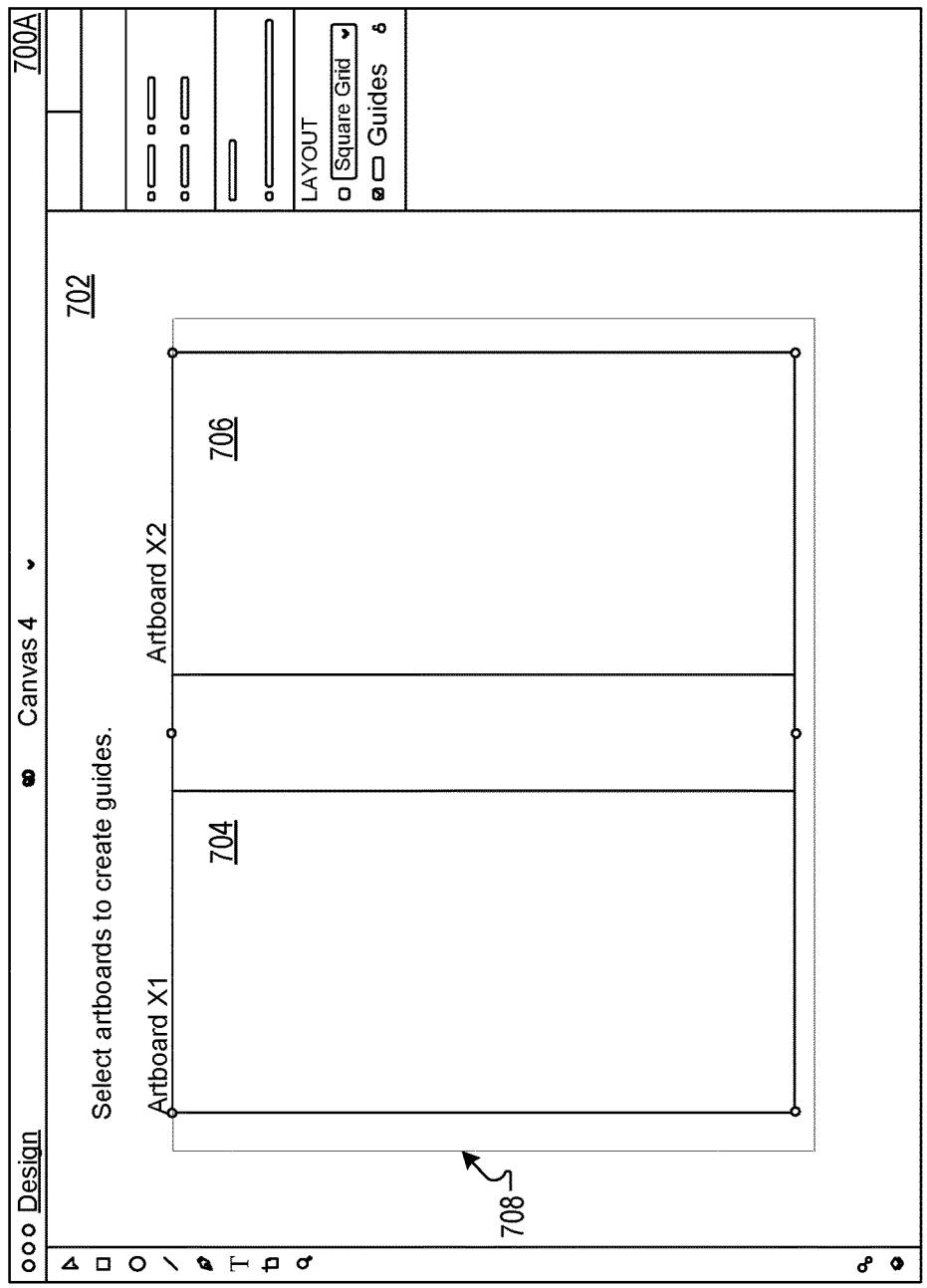
FIG. 7A is a user interface depicting an example design document and simultaneous generation of multiple drawing guides associated with the techniques described herein.

FIG. 7A is a user interface 700A depicting an example design document and simultaneous generation of multiple drawing guides associated with the techniques described herein. The user interface 700A includes a design document 702 and artboards 704 and 706. A user may wish to generate drawing guides for both artboard 704 and artboard 706 at the same time. To do so the user may select all artboards, as shown by selection 708.

Figure 7B:
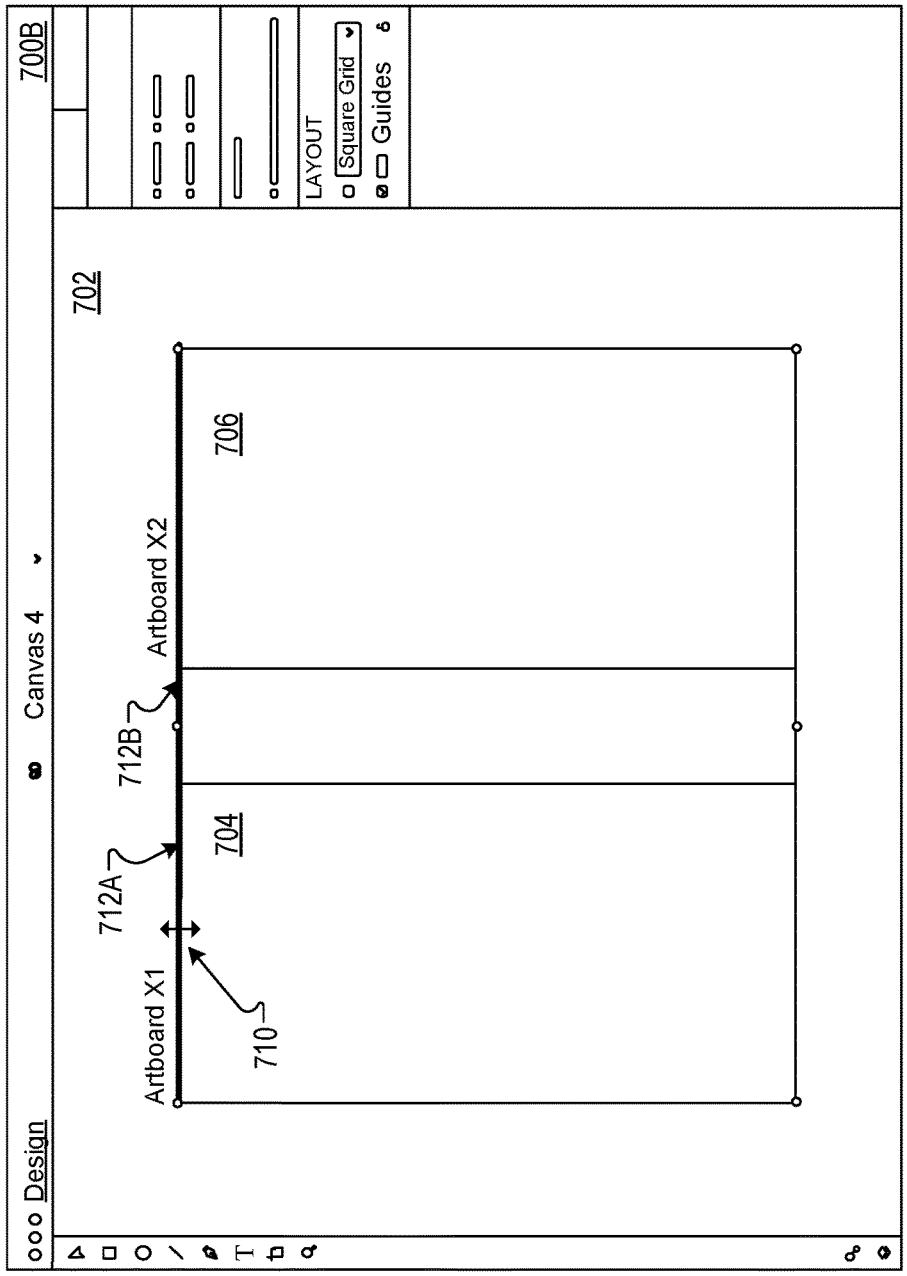
FIG. 7B is a user interface depicting the example design document of FIG. 7A and generation of multiple drawing guides associated with the techniques described herein.

FIG. 7B is a user interface depicting the example design document 702 of FIG. 7A and generation of multiple drawing guides associated with the techniques described herein. Here, the user has selected both artboards 704, 706 as shown in FIG. 7A. The user selects an edge 710 of artboard 704. The selection triggers a highlight (e.g., color change) on the edge of both artboards 704, 706 and simultaneous generation of multiple drawing guides 712A and 712B. Here, the user selected the edge 710 of artboard 704 and performed a drag movement (cursor 714) to trigger simultaneous generation of drawing guide 712A on artboard 704 and drawing guide 712B on artboard 706.

In some implementations, generating multiple drawing guides at the same time on a number of artboards may be displayed to a user with any number of color changes, font changes, and/or line width or pattern changes. Such changes may serve to allow the user to easily view guide selections, modifications, and movements while working with the drawing guides.

Figure 7C:
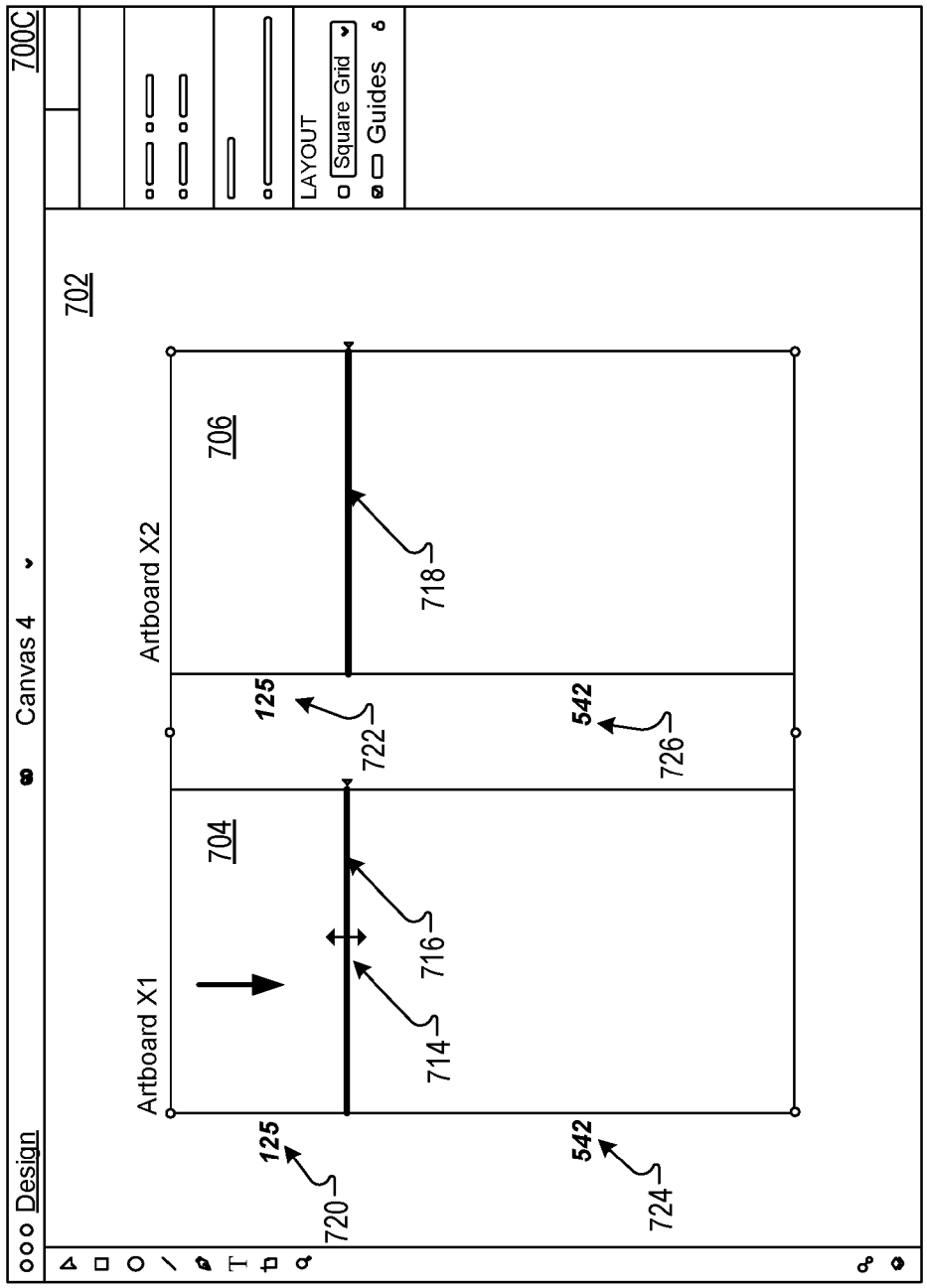
FIG. 7C is a user interface depicting the example design document of FIG. 7B and simultaneous generation of multiple drawing guides associated with the techniques described herein.

FIG. 7C is a user interface 700C depicting the design document of FIG. 7B and simultaneous generation of multiple drawing guides associated with the techniques described herein. Here, the user selected the edge 710 of artboard 704 and performed a drag movement (cursor 714) to trigger generation of a drawing guide 716 on artboard 704. The system 100 simultaneously generates a drawing guide 718 on artboard 706 because the user selected both artboards before generating drawing guide 716. To indicate spacing and/or location of the guides 716 and 718, pixel location indicators 720, 722, 724, and 726 are displayed. In this example, the drawing guides 716 and 718 are shown at the same distance from the top of each artboard at 125 pixels. Similarly, the drawing guides 716 and 718 are shown at the same distance from the bottom of each artboard at 542 pixels.

Figure 7D:
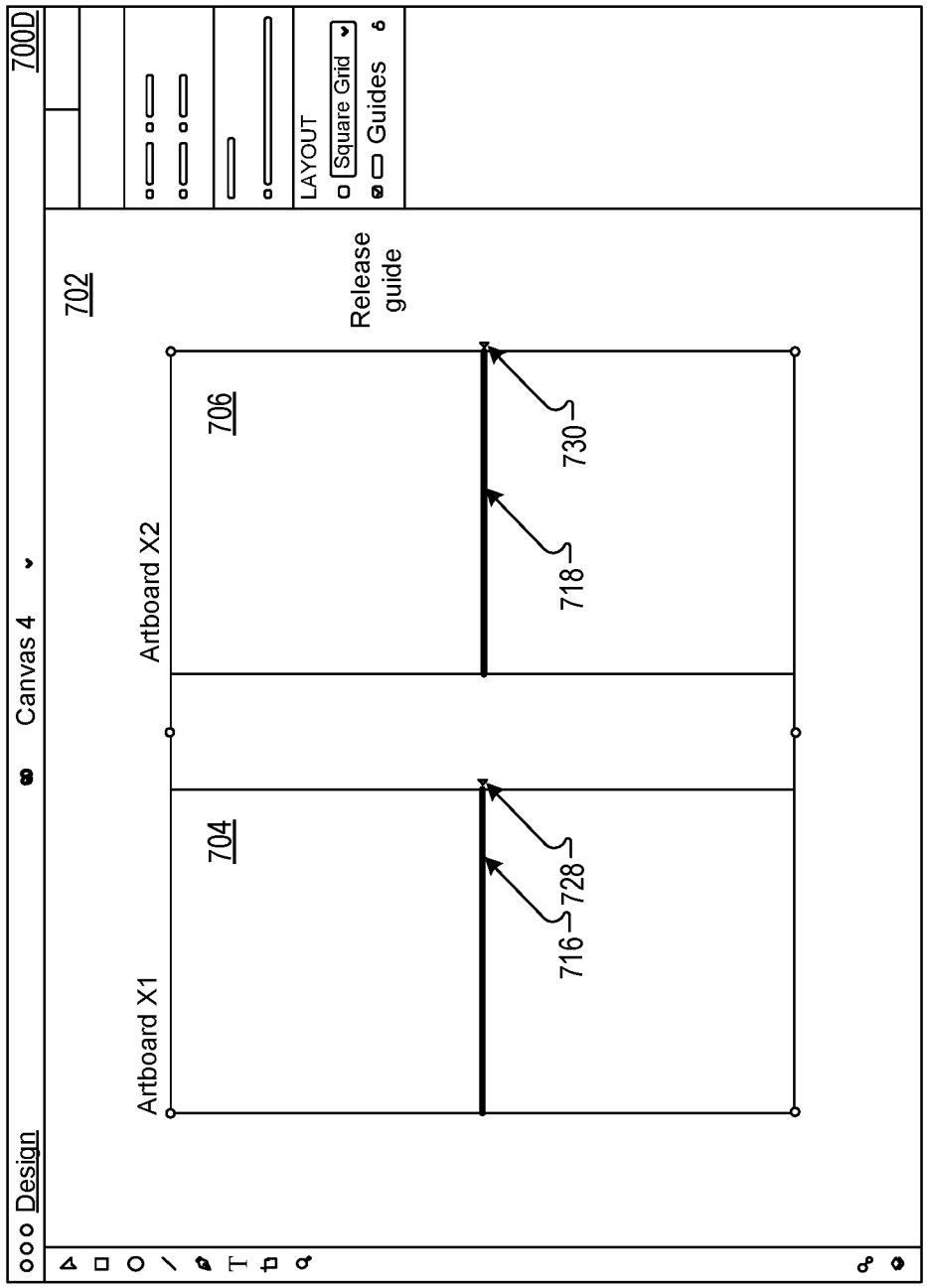
FIG. 7D is a user interface depicting the example design document of FIG. 7C and simultaneous generation of multiple drawing guides associated with the techniques described herein.

FIG. 7D is a user interface 700D depicting the design document of FIG. 7C and simultaneous generation of multiple drawing guides associated with the techniques described herein. Here, the user has used a drag input to generate drawing guides 716 and system 100 has simultaneously generated drawing guide 718. When the user decides the location of the drawing guides is satisfactory, the user may release the guide. Once the system begins to generate the drawing guides, guide handles are displayed for each guide in a respective art board. For example, a guide handle 728 is shown for artboard 704 to allow the user to select and or move the guide 716 without interfering with other content in the artboard. Similarly, a guide handle 730 is shown for artboard 706 to allow the user to select and or move the guide 718 without interfering with other content in the artboard.

Figure 7E:
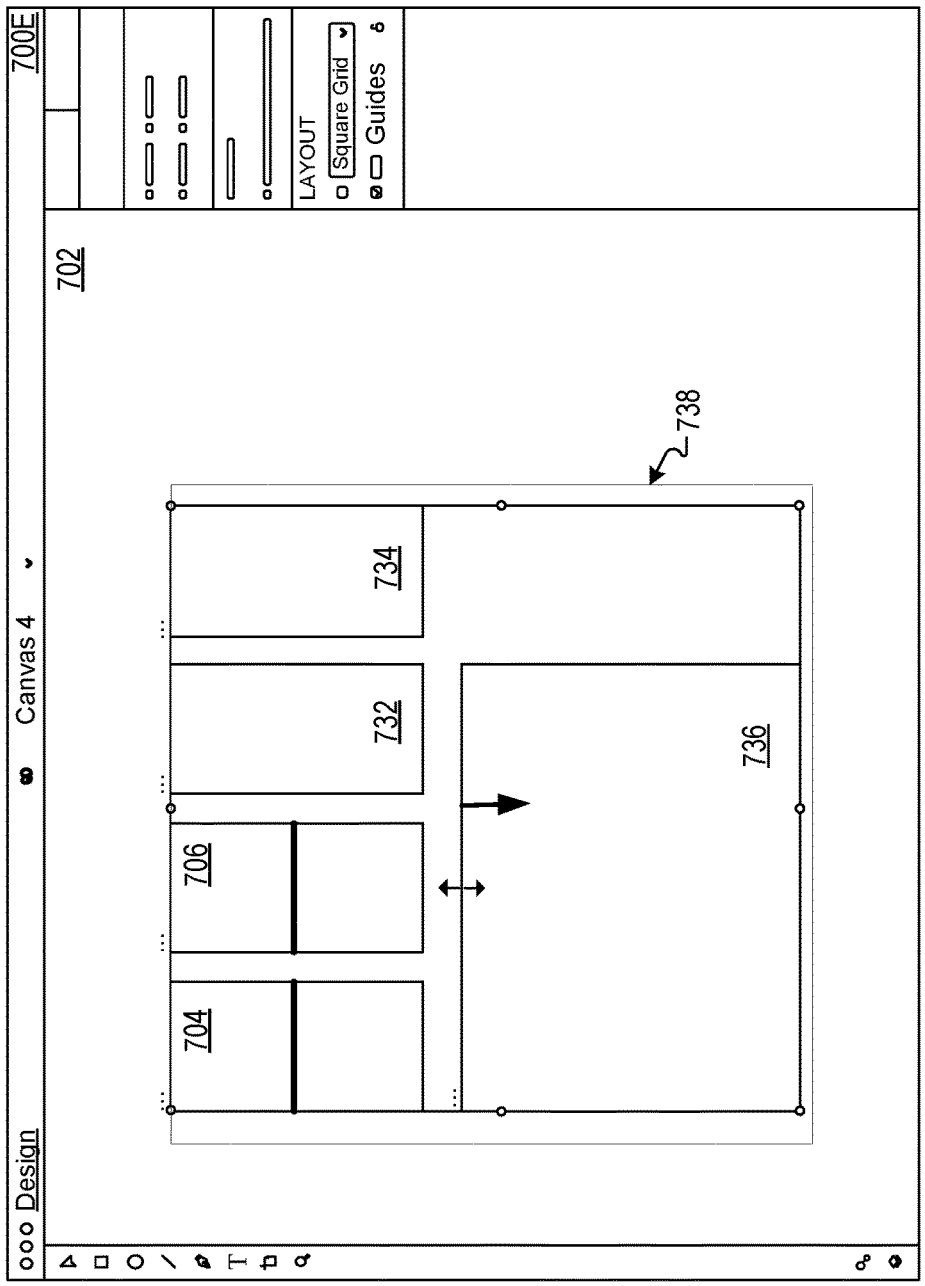
FIG. 7E is a user interface depicting the example design document of FIG. 7D and simultaneous generation of multiple drawing guides on artboards of a different size.

FIG. 7E is a user interface 700E depicting the example design document of FIG. 7D and simultaneous generation of multiple drawing guides on artboards of a different size. In this example, the user generated additional artboards for the document 702. For example, the user generated artboard 732 and artboard 734, which are the same size as artboards 704 and 706. In addition, the user generated artboard 736, which is wider and longer than artboards 704, 706, 732, and 734. The user may wish to generate additional drawing guides for the artboards 704, 706, 732, 734, and 736. As such, the user may begin by selecting all guides, as shown by selection 738.

Figure 7F:
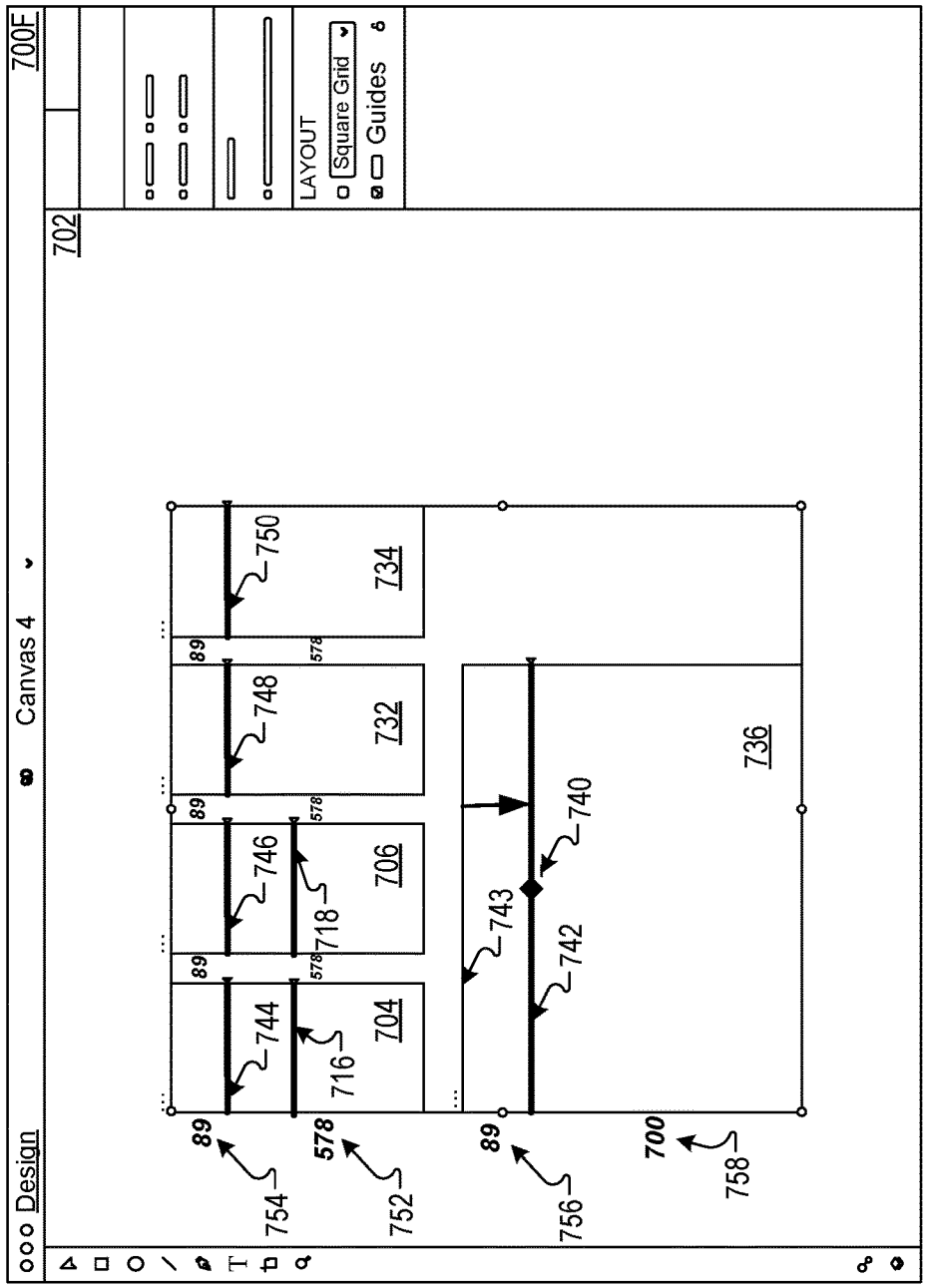
FIG. 7F is a user interface depicting the example design document of FIG. 7E and simultaneous generation of multiple drawing guides on artboards of a different size.

FIG. 7F is a user interface 700F depicting the example design document of FIG. 7E. Once the user selected (738) the artboards of FIG. 7E, the user may then begin to generate a drawing guide 742 in artboard 736 (at cursor 740) by dragging the cursor from an edge 743 of artboard 736 in a downward motion. The system 100 automatically generates a drawing guide 744 for artboard 704, a drawing guide 746 for artboard 706, a drawing guide 748 for artboard 732, and a drawing guide 750 for artboard 734. In this example, the system 100 depicts pixel location indicators for each artboard. For example, pixel location indicators 752 [578] and 754 [89] indicate that the drawing guide 716 is located 89 pixels from the top of the artboard 704 and 752 pixels from the bottom of artboard 704. Similar pixel location indicators are displayed for artboards 706, 732, and 734. In addition, for artboard 736, different pixel location indicator values may be shown because the artboard 736 is a different size than the artboard 704, for example. Here, artboard 736 includes a pixel location indicator 756 with a value of [89], which matches the other pixel location values corresponding to a measurement from a top of each artboard. However, since artboard 736 is longer than artboard 704, for example, then the system 100 displays a pixel location value 758 with a larger value to indicate an actual pixel measurement from a bottom edge of artboard 736. Other indicators are of course possible with any and all artboards associated with a particular document (e.g., canvas).

Figure 7G:
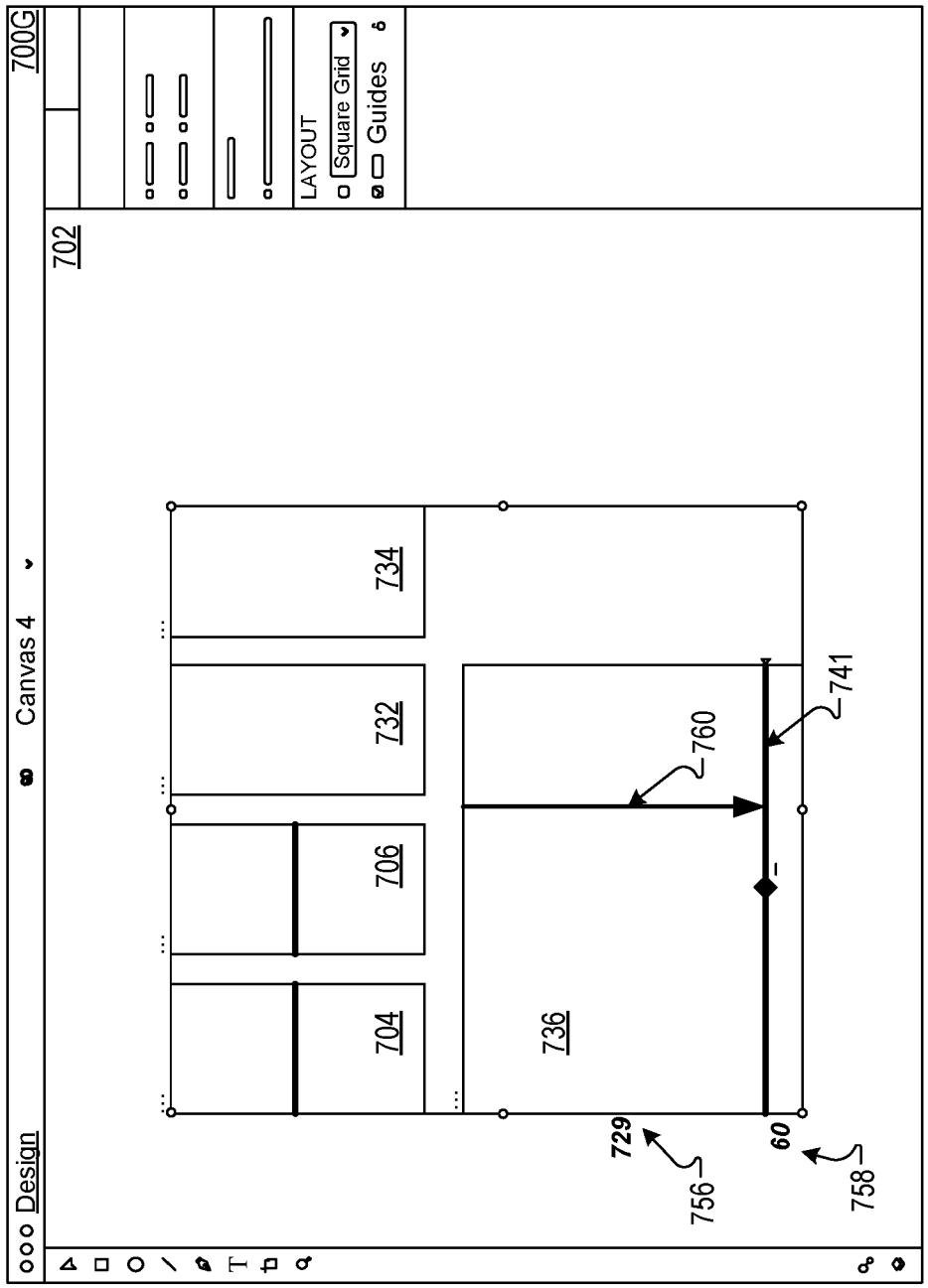
FIG. 7G is a user interface depicting the example design document of FIG. 7F and simultaneous generation of multiple drawing guides on artboards of a different size.

FIG. 7G is a user interface depicting the example design document 700G of FIG. 7F. Artboards 704, 706, 732, 734, and 736 are shown. In this example, the user has selected drawing guide 741 and performed a drag of the guide further downward, as indicated by arrow 760. Because the guide 741 is located below the furthermost pixel location on artboards 704, 706, 732, and 734, the guide 741 is not displayed on those artboards. Instead, the system 100 places the drawing guide 741 on the artboard 736 and updates the pixel location indicators 756 and 758 according to the new location of guide 740.

Figure 8A:
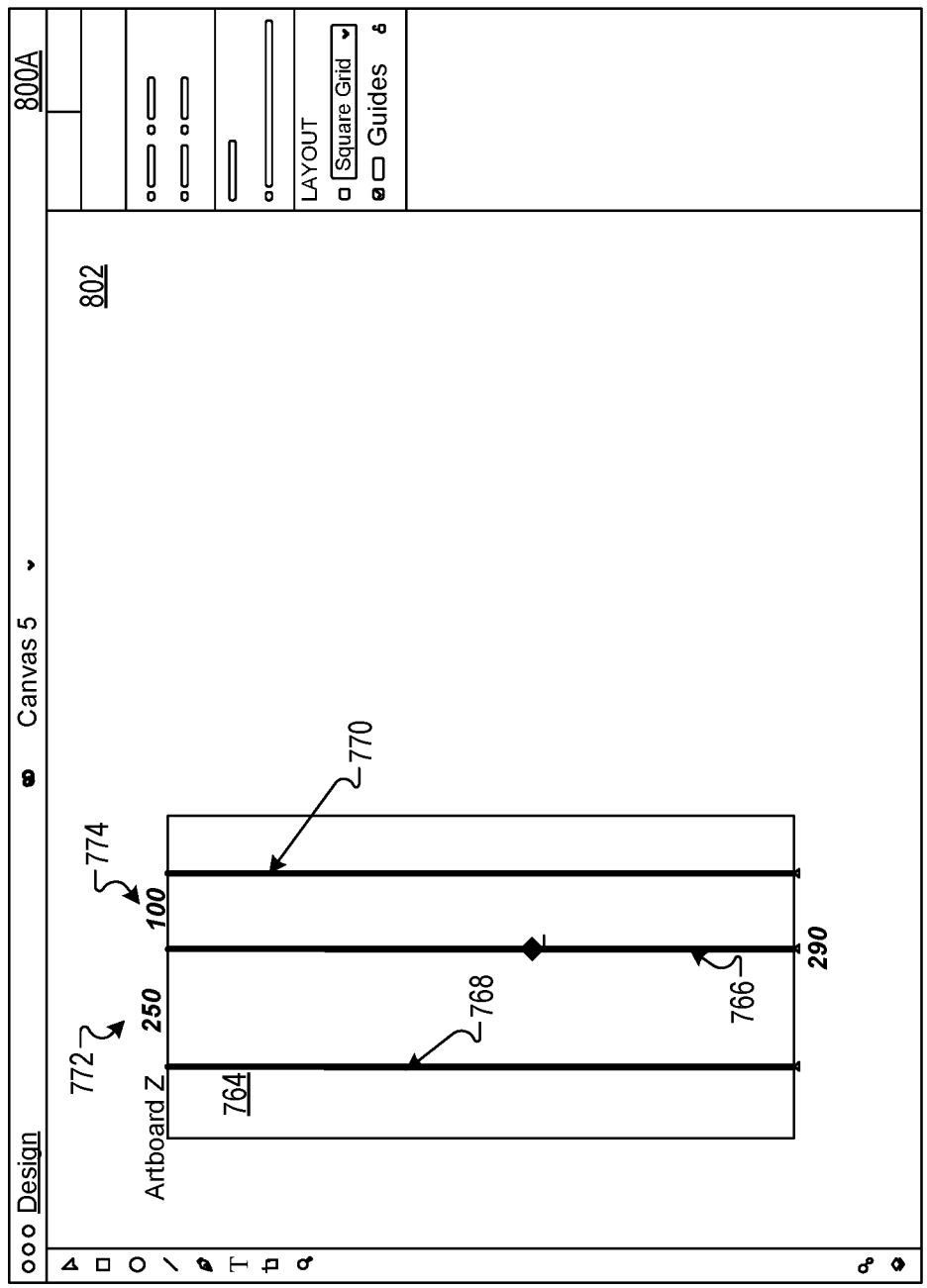
FIG. 8A is a user interface depicting an example design document and an extended drag are feature associated with the techniques described herein.

FIG. 8A is a user interface 800A depicting an example design document 802 and an extended drag feature associated with the techniques described herein. In general, the system 100 may provide an extended drag feature for an artboard, such as artboard 764. The extended drag feature may determine and display the distance of a guide to a nearest surrounding guide (or object) in the artboard. For example, a drawing guide 766 may be generated at the request of a user. Guide 768 is shown in artboard 764 at pixel location 290. The system 100 calculates a distance to guide 768 at 250 pixels away. Similarly, the system 100 calculates a distance to guide 770 at 100 pixels away. Corresponding pixel location indicators 772 and 774 may be displayed to the user. In some implementations, the indicators 772 and 774 may disappear if the user releases guide 766, for example. The system 100 can, in general, determine and display a distance of an object using a nearest horizontal drawing guide and/or vertical drawing guide.

In general, any number of distance measurements may be presented as pixel location indicators in the canvas. For example, the user need not hover over a particular guide to view such distances. The system 100 may instead present indicators associated with drawing guides that may contextually pertain to a particular movement, selection, or element in the canvas/application 108 environment.

Figure 8B:
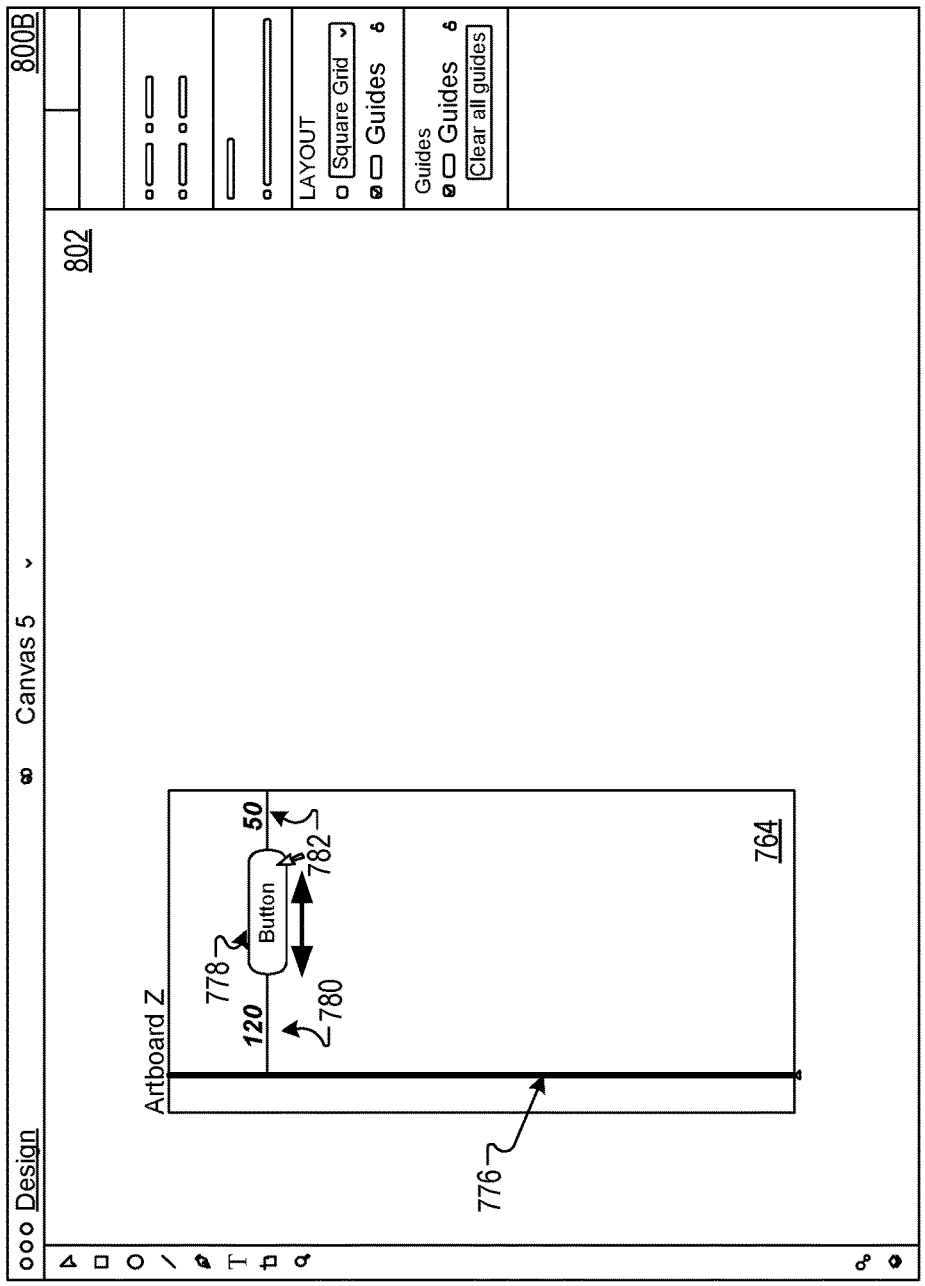
FIG. 8B is a user interface depicting the example design document and determination of a distance of an object to a drawing guide.

FIG. 8B is a user interface 800B depicting the example design document 802 and determination of a distance of an object to a drawing guide (or an artboard edge). In the depicted example, the artboard 764 includes a drawing guide 776. The user may select object 778 and drag the object left or right to trigger display of pixel location indicators 780 and 782. Pixel location indicator 780 displays a pixel distance of 120 indicating the distance from the left edge of the object 778 to the drawing guide 776. Similarly, the pixel location indicator 782 displays a pixel distance of 50 from the right edge of the object 778 to the right edge of the artboard 764. Other movements are possible and in response to such movements, the depicted indicators may be updated accordingly and/or additional indicators may be displayed on artboard 764.

Figure 8C:
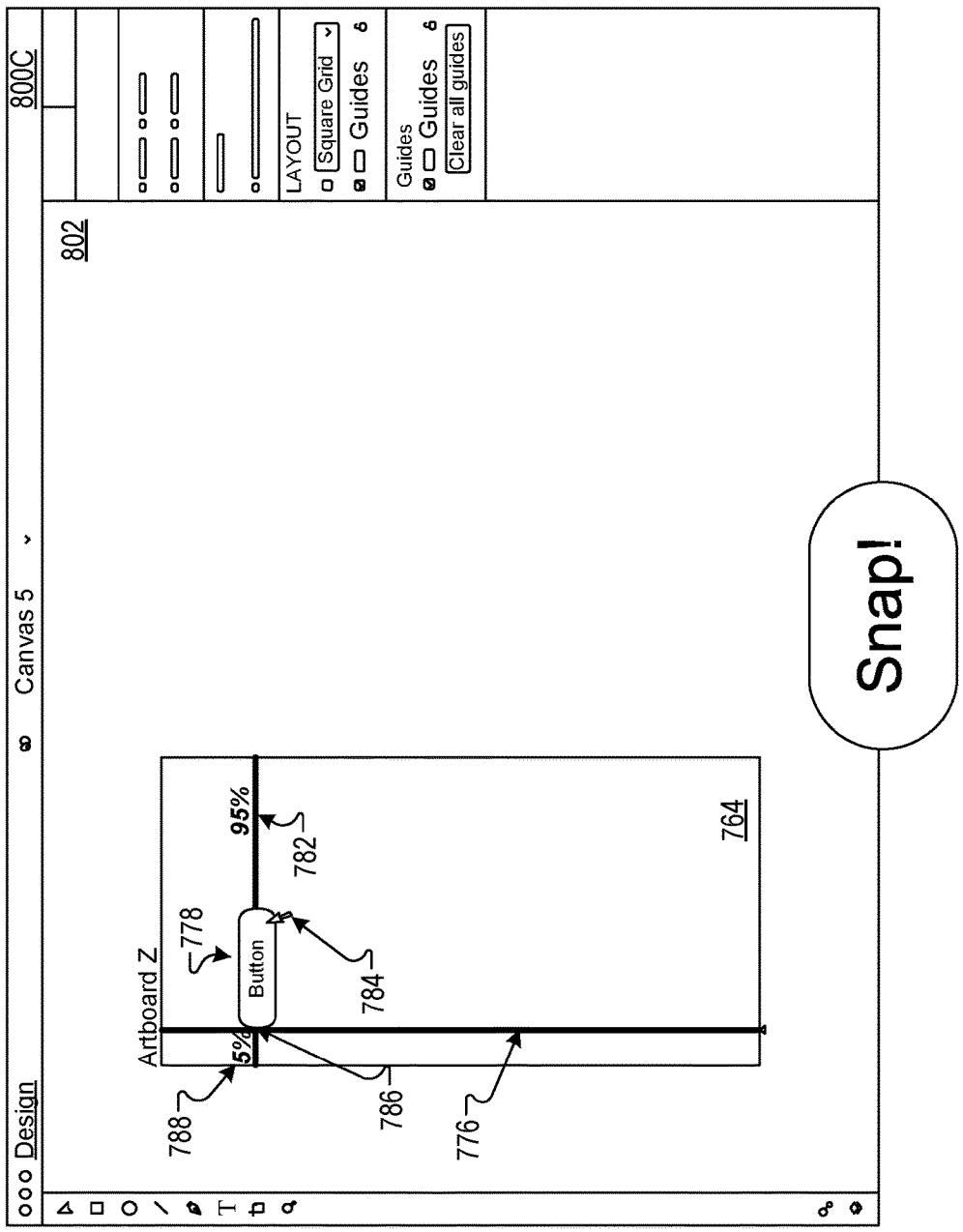
FIG. 8C is a user interface depicting the example design document and dragging and snapping of an object to a drawing guide.

FIG. 8C is a user interface 800C depicting the example design document 802 and dragging and snapping of an object to a drawing guide. In the depicted example, the user selected object 778 and performed a drag motion using cursor 784 to drag the object 778 toward the drawing guide 776. The drag motion snaps 786 the object 778 to the guide 776 upon the left edge of the object 778 meeting (e.g., intersection with) the drawing guide 776. In the depicted example, the location indicators are updated to show percentage distances across the artboard. For example, the indicator 782 now shows that the object 778 is 95% of the total artboard width away from the right side of the artboard 764. Similarly, the indicator 788 now shows that the object 778 is 5% of the total artboard width away from the left side of the artboard 764.

In general, while a user is moving the object 778, the sides of a bounding box associated with the object 778 are tracked and when the sides of the bounding box are close enough to a guide, the object 778 is snapped to the guide 776. The object 778 may be configured to detect snap-to areas including guides. When a user is moving the guide 776, the guide 776 is configured to detect snap-to areas (other objects, guides, edges, etc.).

The user interfaces described herein may be generated in an electronic drawing application (e.g., graphic design application). Although certain numbers of canvases and/or artboards are depicted, any number of canvases, artboards, objects, text, images, and/or other document content may be provided. In the described examples, a user may use an input device (not shown) to generate one or more canvases, artboards, and/or drawing guides.

Figure 9:
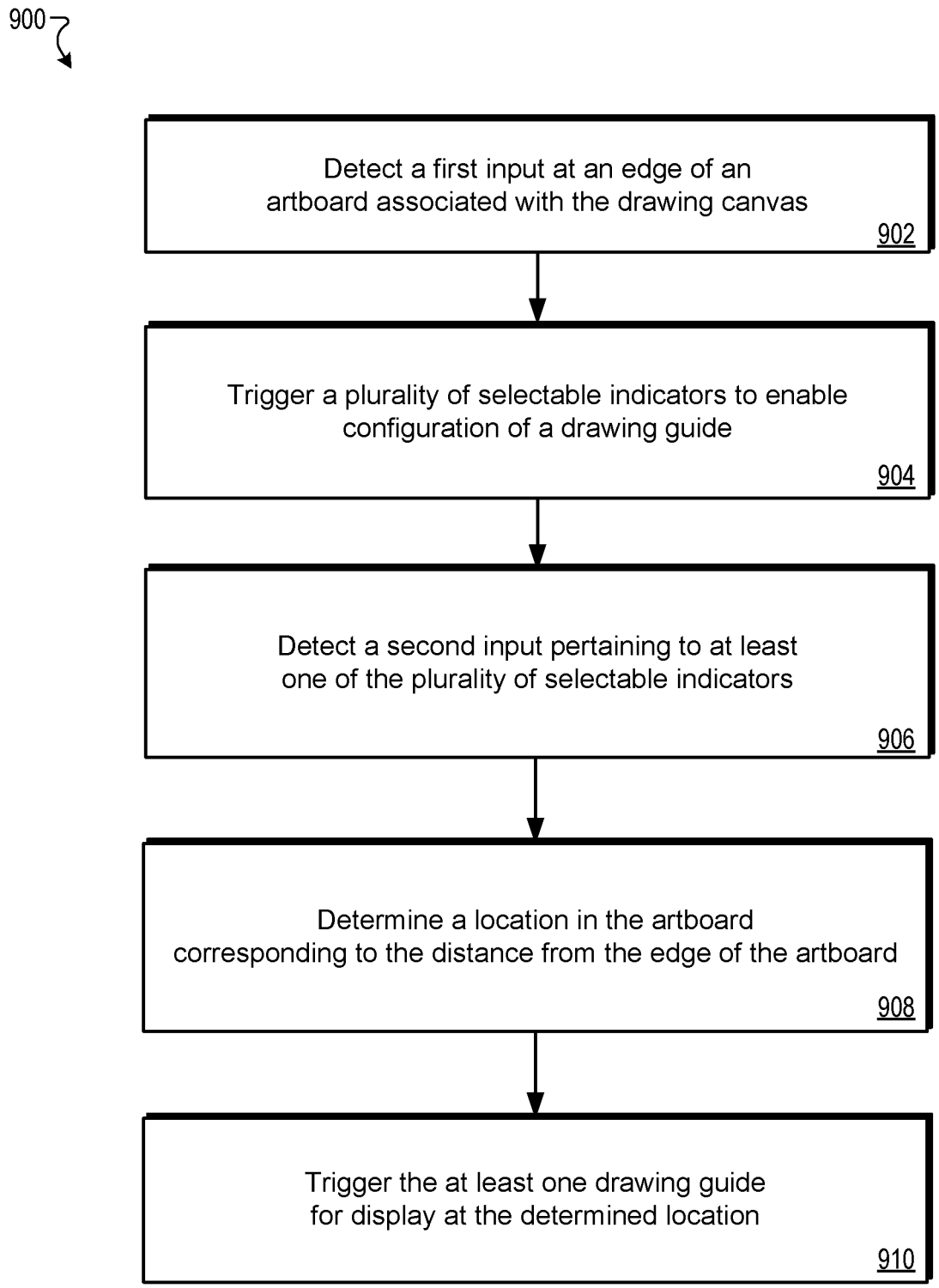
FIG. 9 is an example flowchart illustrating example operations of the system of FIGS. 1A-1B.

FIG. 9 is an example flowchart illustrating example operations 900 of the system of FIGS. 1A-1B. Process 900 may be performed by a system such as system 100 of FIGS. 1A-1B. Process 900 takes input from users and generates contextual drawing guides at the artboard container level. For example, the process 900 improves the use of drawing guides by taking into account the context in which location the user is requesting a drawing guide.

Process 900 may be performed by computing device 102, for example. The computing device 102 may include at least one memory 104 including instructions to carry out process 900 and at least one processor 106 that is operably coupled to the at least one memory 104 and that is arranged and configured to execute instructions that, when executed, cause the at least one processor to carry out the following steps. In general, the process 900 may utilize any combination of algorithms provided by the graphic design application 108, the graphics analysis system 110, the guide generator/editor 112, an artboard/canvas generator 114, an input detector 116, and a smart guide generator/editor 118.

Process 900 includes a computer-implemented method for utilizing drawing guides in a drawing canvas (e.g., graphic design application 108). In this example, a user may have created an electronic drawing canvas with at least one artboard (e.g., artboard 130).

At block 902, the process 900 includes detecting a first input at an edge of an artboard associated with the drawing canvas. The first input may include a hover motion. For example, a user may use an input device to perform a hover and selection motion to begin to generate one or more drawing guides (e.g., drawing guide 134 and drawing guide 142). That is, the user may use the input device to hover (indicated by hover action 206) over an edge 208 of the artboard 130 and may select the edge. Upon performance of the hover and select motion, the system 100 may detect the input on the edge 208 of the artboard 130.

At block 904, the process 900 includes triggering, responsive to the detected first input (e.g., hover and select motion), a plurality of selectable indicators to enable the user to configure a drawing guide. For example, the system 100 may generate a selectable line at the edge 208 of the artboard 130. The line may be moved across the artboard to define a drawing guide.

In addition, responsive to the detection of a hover input performed by the user, the system 100 may trigger the selectable indicators to indicate functionality to the user. For example, indicated functionality may include functionality to configure a drawing guide representing an interactive reference for placing content in the art board. In some implementations, the hover input may trigger for the artboard 130, for example, display of a pixel location indicator (e.g., pixel location indicator 218) depicting a measure of distance (e.g., distance 214) from one or more edges (e.g., edge 208) of the artboard or a measure of distance from one or more drawing objects (not shown).

At block 906, the process 900 includes detecting a second input pertaining to at least one of the plurality of selectable indicators. The second input may, for example, include a drag (and release) input defining a distance from the edge of the artboard. For example, to generate a drawing guide for the artboard 130, the user may drag the cursor from the artboard edge 208 and a drawing guide 134 may appear and be dragged into the artboard 130 as the user continues to move the cursor rightward or leftward. Similarly, the user may generate a horizontal drawing guide using a drag motion from the top edge or bottom edge of an artboard. The drawing guide 136 may provide an interactive reference for placing content in the artboard 130, for example. In some implementations, the second input may be a selection, a keyboard stroke, a mouse click, an electronic pen input, a touch input, a controller input, a joystick input, or any combination thereof.

Other pixel location indicators may be shown, for example with respect to other drawing guides within the artboard. In some implementations, the user may instead select upon an existing drawing guide and perform the drag and release input to move the existing drawing guide. Whether the user selects upon an existing guide or wishes to generate a new guide by selecting an edge of the artboard 130, an existing or new drawing guide may be configured to change from a 100 percent opacity value (e.g., fully visible) triggering detection of the selection and/or drag input to a 50 percent opacity value triggering detection of the release input (50 percent transparent). Other percentages of opacity and/or transparency are possible.

In some implementations, other user interface changes may occur when the user interacts with an artboard. For example, if a user is currently dragging a drawing guide onto an artboard, the distance of the drawing guide from both edges of the artboard may be displayed. At the same time, the artboard name may dim to 25 percent transparency to indicate that artboard is being worked upon. In addition, font size for the displayed distances may remain the same regardless of zoom in and out of a particular artboard or canvas.

In some implementations, the indicators modify a look of an object or element (e.g., an artboard edge) associated with (or provided within) the artboard. For example, the system 100 may depict an artboard edge in a different color. Similarly, the system 100 may depict an artboard edge or other element with a different pixel line width. In some implementations, the indicators may include guide handle indicators (e.g., indicators 138 and 142) that indicate that the at least one drawing guide is editable. In some implementations, the indicators include a direction indicator depicting two or more directions in which the at least one drawing guide is movable. For example, indicators 210 and 212 each indicate two directions in which respective drawing guides 134 or 136 may be moved within artboard 130. In particular, if the user wishes to move (or create) a drawing guide, the user may hover over an edge or indicator to select, drag, and release a drawing guide within the artboard 130. For example, the user may hover, select, and drag the indicator 210 and release the indicator 210 at the location shown by vertical drawing guide 134.

At block 908, the process 900 includes determining a location in the artboard corresponding to the distance from the edge of the artboard. For example, a drag and release input may define a distance from an edge of the artboard. The system 100 may determine the distance and the corresponding location in the artboard.

At block 910, the process 900 includes triggering the at least one drawing guide for display at the determined location. If the user selects an edge of the artboard and begins to drag a drawing guide (e.g., drawing guide 134) into the artboard 130 and releases the guide at a location, the system 100 detects the release and may trigger the at least one drawing guide for display at the determined location (e.g., at the release point). The defined distances between edges of the artboard (e.g., distance 214 and distance 216) may be shown near or within the artboard 130, as pixel indicators (e.g., pixel location indicators [187] 218 and [185] 220).

In some implementations, the drawing guides described herein include copy-and-paste functionality. Such drawing guides may be configured to be copied from an artboard and pasted into any number of additional artboards generated in the drawing canvas. The artboards may be any size and shape and may still utilize the drawing guide generated for another artboard.

In some implementations, the drawing guides described herein are configured to be stored as default drawing guides for one or more artboards. This may provide an advantage of allowing a reorganization of the artboards within a particular drawing canvas while allowing retention of artboard configuration settings of the one or more drawing guides.

In some implementations, configuring a drawing guide for a first artboard triggers generation of the drawing guide for each open artboard within the drawing canvas. In some implementations, artboard include drawing content and such content may be configured to snap to a drawing guide based on the settings of the drawing guide.

The systems and methods described herein can be used in various tools. For example, the systems and methods can be used in any suitable digital media editor configured to edit vector drawings. Examples of digital media editor can include ADOBE® Illustrator, ADOBE® Photoshop, ADOBE® Photoshop Lightroom, ADOBE® InDesign, ADOBE® Dreamweaver, ADOBE® After Effects, ADOBE® Premiere Pro, and ADOBE® XD (all available from Adobe, Inc. of San Jose, Calif.), or any other suitable digital media editor.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer (e.g., system 100) may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer (e.g., system 100) having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system (e.g., system 100) that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for utilizing drawing guides in an electronic canvas, the method comprising:
   identifying a plurality of artboards based on a user selection;
   detecting a first input at an edge of an artboard from the plurality of artboards, the first input including a hover motion;
   triggering, responsive to the detected first input, a plurality of selectable indicators to enable configuration of at least one drawing guide for providing an interactive reference for placing content in the artboard;
   detecting a second input pertaining to at least one of the plurality of selectable indicators, the second input defining a distance from the edge of the artboard;
   determining a location in the artboard corresponding to the distance from the edge of the artboard;
   triggering the at least one drawing guide for display in the artboard at the determined location; and
   automatically generating an additional drawing guide for each of the plurality of artboards based on the user selection and the determined location in the artboard.

2. The method of claim 1, wherein the plurality of indicators comprise:
   guide handle indicators depicting that the at least one drawing guide is editable, and a direction indicator depicting two or more directions in which the at least one drawing guide is movable.

3. The method of claim 1, wherein the first input triggers, for the artboard, display of:
   a location indicator depicting a measure of distance from one or more edges of the artboard or a measure of distance from one or more drawing objects, a color change of the edge of the artboard or a color change of the at least one drawing guide associated with the first input, each triggered by the first input.

4. The method of claim 1, wherein the at least one drawing guide is configured to change from a first opacity value to a second opacity value upon detecting the second input, wherein the first opacity value is higher than the second opacity value.

5. The method of claim 1, wherein the at least one drawing guide includes copy-and paste functionality, and the method further comprises copying the at least one drawing guide from the artboard and pasting the at least one drawing guide into a plurality of additional artboards generated in the electronic canvas; and
   storing the at least one drawing guide as a default drawing guide, for the at least one artboard and for the plurality of additional artboards, wherein reorganizing the artboard and the plurality of additional artboards within the electronic canvas results in retaining configuration settings of the at least one drawing guide for the artboard and for the plurality of additional artboards.

6. The method of claim 1, wherein the guide generator is a replacement for a ruler guide associated with the electronic canvas.

7. The method of claim 1, wherein configuring the at least one drawing guide for the artboard triggers generation of the at least one drawing guide for each open artboard within the electronic canvas.

8. A system for arranging content in an electronic document at a computing device, the system comprising:
   at least one memory including instructions;
   at least one processor that is operably coupled to the at least one memory and that is arranged and configured to execute instructions that, when executed, cause the at least one processor to implement an application having a user interface, the application having access to an input device and comprising:
   a guide generator configured to utilize the memory and processor to:
      identify a plurality of artboards based on a user selection;
      detect a first input at an edge of an artboard, the first input including a hover motion;
      trigger, responsive to the detected first input, a plurality of selectable indicators representing functionality to configure at least one drawing guide for providing an interactive reference for placing content in the artboard;
      detect a second input pertaining to at least one of the plurality of selectable indicators, the second input defining a distance from the edge of the artboard;
      determine a location in the artboard corresponding to the distance from the edge of the artboard; and
      trigger the at least one drawing guide for display at the determined location; and
      automatically generating an additional drawing guide for each of the plurality of artboards based on the user selection and the determined location in the artboard.

9. The system of claim 8, wherein the plurality of indicators comprise at least:
   guide handle indicators depicting that the at least one drawing guide is editable, and a direction indicator depicting two or more directions in which the at least one drawing guide is movable.

10. The system of claim 8, wherein the first input triggers, for the artboard, display of:
    a location indicator depicting a measure of distance from one or more edges of the artboard or a measure of distance from one or more drawing objects, a color change of the edge of the artboard or a color change of the at least one drawing guide associated with the first input, each triggered by the first input.

11. The system of claim 8, wherein the content is configured to snap to the at least one drawing guide.

12. The system of claim 8, wherein the at least one drawing guide includes copy and-paste functionality, and the guide generator is further configured to:
    receive a command to copy the at least one drawing guide from the artboard and receive a command to paste the at least one drawing guide into a plurality of additional artboards generated in an electronic canvas; and
    store the at least one drawing guide as a default drawing guide, for the at least one artboard and for the plurality of additional artboards, wherein reorganizing the artboard and the plurality of additional artboards within the electronic canvas results in retaining configuration settings of the at least one drawing guide for the artboard and for the plurality of additional artboards.

13. The system of claim 8, wherein the guide generator is a replacement tool for a ruler guide associated with the electronic document.

14. The system of claim 8, wherein configuring the at least one drawing guide for the artboard triggers generation of the at least one drawing guide for each open artboard within the electronic document.

* * * * *